US009804667B2

United States Patent
Ogasawara et al.

(10) Patent No.: US 9,804,667 B2
(45) Date of Patent: Oct. 31, 2017

(54) ELECTRONIC APPARATUS

(71) Applicant: NINTENDO CO., LTD., Kyoto (JP)

(72) Inventors: Yoshiyasu Ogasawara, Kyoto (JP); Kazuyoshi Osawa, Otsu (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/019,042

(22) Filed: Feb. 9, 2016

(65) Prior Publication Data
US 2016/0231807 A1 Aug. 11, 2016

(30) Foreign Application Priority Data

Feb. 10, 2015 (JP) ................................. 2015-024024
Feb. 10, 2015 (JP) ................................. 2015-024034

(51) Int. Cl.
| | |
|---|---|
| *G09G 5/00* | (2006.01) |
| *G06F 3/00* | (2006.01) |
| *G06F 3/01* | (2006.01) |
| *H04N 5/232* | (2006.01) |
| *H04N 5/33* | (2006.01) |

(52) U.S. Cl.
CPC .............. *G06F 3/005* (2013.01); *G06F 3/017* (2013.01); *H04N 5/23222* (2013.01); *H04N 5/23293* (2013.01); *H04N 5/33* (2013.01)

(58) Field of Classification Search
CPC . G06F 3/005; G06F 3/01; G06F 3/017; G06F 3/0488; H04N 5/23222; H04N 5/23229
See application file for complete search history.

(56) References Cited

U.S. PATENT DOCUMENTS

| | | | | |
|---|---|---|---|---|
| 6,556,185 | B2 * | 4/2003 | Rekimoto | G01C 21/3635 345/157 |
| 2006/0038833 | A1 * | 2/2006 | Mallinson | A63F 13/02 345/633 |
| 2010/0328201 | A1 * | 12/2010 | Marvit | G06F 1/1613 345/156 |
| 2011/0159957 | A1 * | 6/2011 | Kawaguchi | A63F 13/08 463/31 |
| 2011/0305368 | A1 * | 12/2011 | Osako | G06T 7/74 382/103 |
| 2012/0040759 | A1 * | 2/2012 | Ito | A63F 13/428 463/37 |
| 2012/0219227 | A1 * | 8/2012 | Osako | G06K 9/4604 382/199 |

(Continued)

FOREIGN PATENT DOCUMENTS

JP 2006-271663 10/2006

*Primary Examiner* — Joe H Cheng
(74) *Attorney, Agent, or Firm* — Nixon & Vanderhye P.C.

(57) ABSTRACT

An exemplary portable electronic apparatus includes a display provided at a front surface thereof and an infrared camera provided at a side surface thereof. A contour image indicating a contour of a hand of a user included in an image captured by the infrared camera, and a guide frame image indicating a region smaller than an imaging range of the infrared camera, are displayed on the display in perspective form such that the images are obliquely viewed images. Accordingly, it is made easy for the user to recognize the position of the hand in a side surface direction of the portable electronic apparatus, and thus the user can put their hand within a range suitable for a gesture input.

24 Claims, 12 Drawing Sheets

(56) References Cited

U.S. PATENT DOCUMENTS

| | | | |
|---|---|---|---|
| 2014/0072274 A1* | 3/2014 | Nitta | H04N 9/87 386/230 |
| 2016/0006947 A1* | 1/2016 | Kowatari | B60R 1/00 348/148 |
| 2016/0063711 A1* | 3/2016 | Ogasawara | G06T 7/0044 348/164 |
| 2016/0073017 A1* | 3/2016 | Ogasawara | H04N 5/23219 463/31 |
| 2016/0073033 A1* | 3/2016 | Ogasawara | A63F 13/428 348/207.1 |
| 2016/0231773 A1* | 8/2016 | Inoue | G06F 1/1607 |
| 2016/0232404 A1* | 8/2016 | Kitazono | G06K 9/00355 |
| 2016/0232673 A1* | 8/2016 | Aoyagi | G06K 9/00335 |
| 2016/0232674 A1* | 8/2016 | Tanaka | G06F 3/017 |
| 2016/0232675 A1* | 8/2016 | Ogasawara | G06F 3/017 |

* cited by examiner

FIG. 13
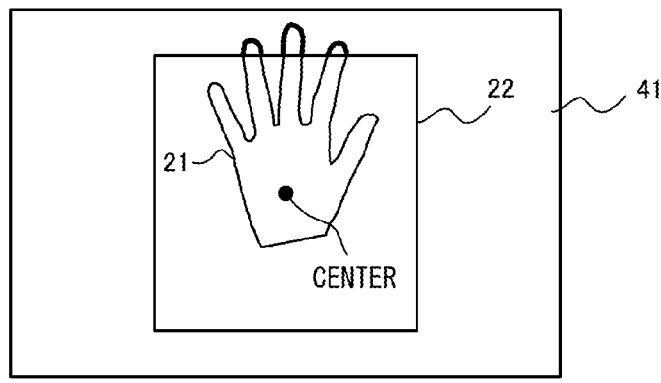
FIG. 14
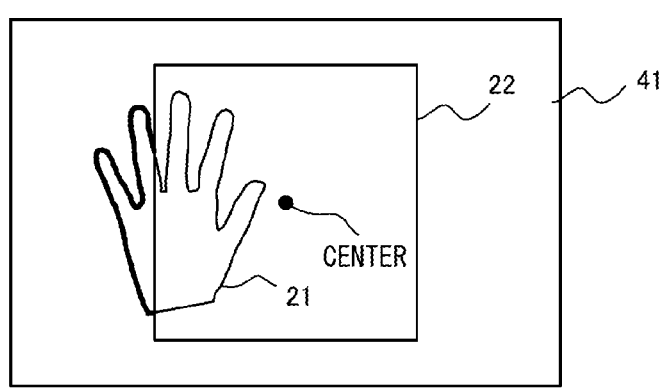
FIG. 15
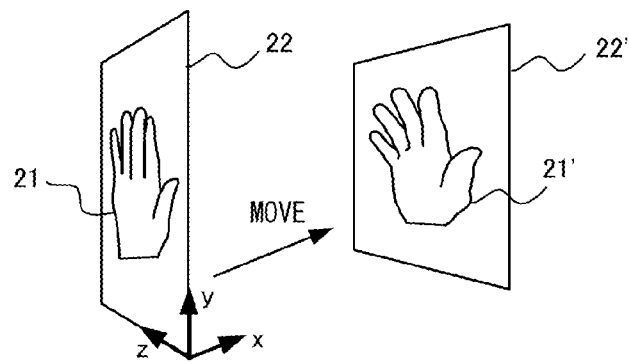
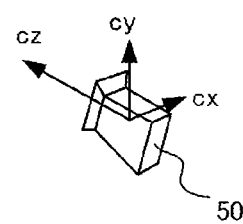

FIG. 16
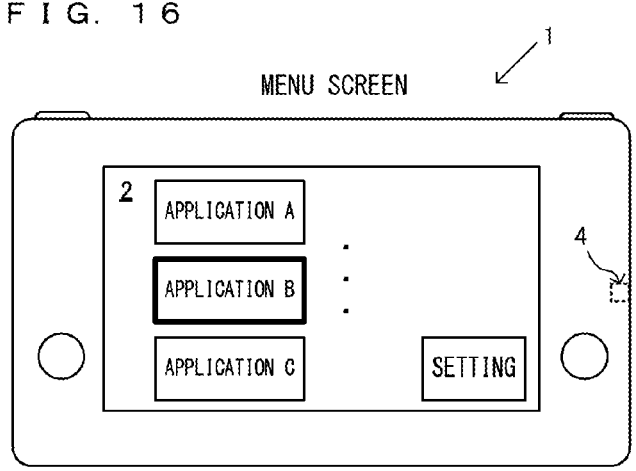
FIG. 17
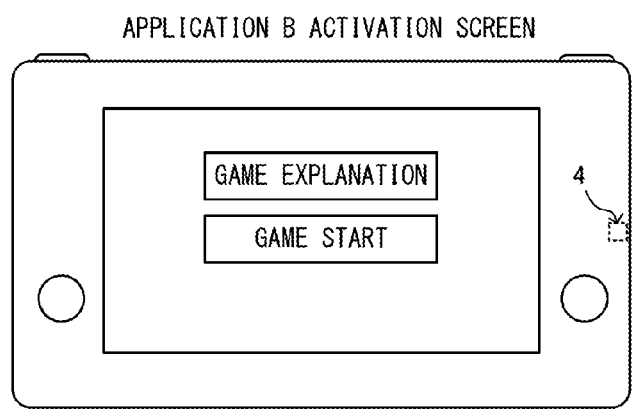 
FIG. 18
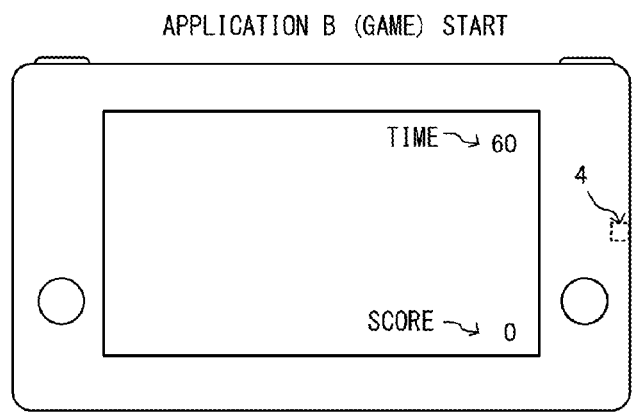 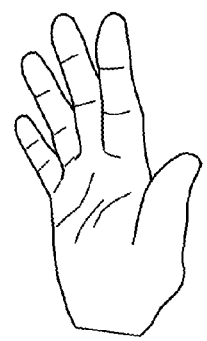

ELECTRONIC APPARATUS

CROSS REFERENCE TO RELATED APPLICATION

The disclosures of Japanese Patent Application Nos. 2015-24024 and 2015-24034, filed on Feb. 10, 2015, are incorporated herein by reference.

FIELD

The technique disclosed here relates to a hand-held electronic apparatus capable of performing predetermined information processing.

BACKGROUND AND SUMMARY

Hitherto, there is a portable game apparatus including a display and a camera provided behind the display. In such a conventional game apparatus, a captured image can be obtained by the camera, and an image based on a result of analysis of the obtained image can be displayed on the display.

However, in the above conventional apparatus, an image captured in a back surface direction of the display by using the camera is displayed on the display, and thus there is room for improvement in that a captured image from a camera which captures an image in another direction is displayed so as to be easily viewable by a user.

Therefore, an object of the exemplary embodiments is to provide an electronic apparatus capable of displaying an image from a camera, which captures an image in a predetermined direction, such that the image is easily viewable by a user.

In the exemplary embodiments, in order to attain the object described above, the following configuration examples are exemplified.

A system according to an embodiment includes a camera, an acquiring section, a display controller, and a processor. The camera captures an image in a side surface direction of the system. The acquiring section acquires an input image captured by the camera. The display controller displays an image obtained by inclining a subject indicated by the input image acquired by the acquiring section in a predetermined direction, on a display section. The processor performs a predetermined application process on the basis of the input image acquired by the acquiring section.

According to the above, when displaying, on the display section, an image of the subject captured by the camera which captures an image in the side surface direction, the image of the subject can be displayed so as to be inclined in the predetermined direction, so that, for example, a display that is easily viewable by a user can be performed.

In another configuration, the display controller may display an image obtained by obliquely viewing the input image, on the display section.

According to the above, by displaying the image obtained by obliquely viewing the captured input image, an object present in the side surface direction of the system can be displayed without an uncomfortable feeling, so that a display that is easily viewable by a user can be performed.

In another configuration, the display controller may display the image in such a form as to allow a user to recognize relative positions of the camera and an object included in an imaging range of the camera.

According to the above, the image can be displayed so as to allow the user to recognize the position of the object present in the side surface direction of the system.

In another configuration, the display controller may display the image in such a form as to allow a user to recognize a position, in a depth direction, of an object included in an imaging range of the camera.

According to the above, the image can be displayed so as to allow the user to recognize the position, in the depth direction, of the object present in the side surface direction of the system.

In another configuration, the display controller may display the image on the display section such that an image of an object included in an imaging range of the camera, the image of the object being displayed on the display section, is viewable in a manner which is the same as that when a user directly sees the object.

According to the above, the object displayed on the display section is viewable in the same manner as that of the object viewed from the user, and thus is easily viewable by the user.

In another configuration, the display controller may display a guide image which allows a user to recognize whether an object included in an imaging range of the camera is present at an appropriate position.

According to the above, by the guide image, the user can be caused to recognize whether the object is present at an appropriate position, and the user can be guided to an appropriate position.

In another configuration, the display controller may further display, on the display section, a guide image indicating a predetermined region in an imaging range of the camera.

According to the above, by displaying the guide image, for example, an object present in the side surface direction can be easily put within the imaging range of the camera.

In another configuration, the display controller may display, on the display section, an image obtained by inclining the guide image and the input image in a predetermined direction.

According to the above, since the input image and the guide image are displayed so as to be inclined in the predetermined direction, for example, a display that is easily viewable by a user can be performed, and an object can also be easily put within the imaging range of the camera.

In another configuration, the display section may be provided to the system. The camera captures an image in a side surface direction of the display section. The display controller displays the image on a display screen of the display section and at an imaging direction side of the camera.

According to the above, the imaging direction of the camera and the display position of the image on the display screen of the display section can be caused to coincide with each other. For example, when an image in a right side surface direction of the display section is captured by the camera, the image captured by the camera can be displayed on the display screen of the display section and at the right side. Thus, for example, it can be made easy for a user to recognize a positional relation of an object present in the side surface direction.

In another configuration, the display controller may display the image obtained by inclining the subject indicated by the acquired input image in the predetermined direction, as well as an image showing a result of the predetermined application process.

According to the above, it can be made easy to cause a user to recognize positional relations of the subject and the camera and a result of the application process based on the positional relations.

In another configuration, the display controller may display, on the display section, an image obtained by abstracting an object included in an imaging range of the camera.

According to the above, the object included in the imaging range of the camera can be abstracted and displayed, so that, for example, a display that is easily viewable by a user can be performed.

In another configuration, the display controller may display, on the display section, an image indicating a contour of the object included in the imaging range of the camera.

In another configuration, the display controller may display only a specific object among a plurality of objects included in an imaging range of the camera, on the display section.

According to the above, only the specific object can be displayed, and a display can be prevented from being difficult to view due to another object being displayed.

In another configuration, the system may further include a detector configured to detect a hand of a user on the basis of the input image. The processor performs the application process on the basis of a result of the detection by the detector.

According to the above, the hand of the user can be detected, and the application process can be performed on the basis of the result of the detection of the hand.

In another configuration, the detector may detect a gesture made by the user.

According to the above, the gesture made by the user can be detected, and, for example, the application process can be performed on the basis of an input using the gesture.

In another configuration, the system may further include a determiner configured to determine whether at least a part of an object included in the input image protrudes from a predetermined region in an imaging range of the camera. The display controller displays an image corresponding to a result of the determination by the determiner, on the display section.

According to the above, the user can be caused to recognize whether a part of the object protrudes from the predetermined region in the imaging range.

In another configuration, the display controller may display or hide the image in accordance with a status of execution of the predetermined application process performed by the processor.

According to the above, the image can be displayed or hidden in accordance with the status of execution of the application or a selection made by a user, and, for example, the image can be displayed only prior to start of the application, or can be displayed only at the time of a tutorial.

In another configuration, the system may be a hand-held electronic apparatus.

In another configuration, the camera may be an infrared camera capable of receiving infrared light.

A second embodiment may be an electronic apparatus including: an input device; a camera configured to capture an image in a side surface direction of the input device; an acquiring section configured to acquire an input image captured by the camera; a display controller configured to display an image obtained by inclining a subject indicated by the input image acquired by the acquiring section in a predetermined direction, on a display section; and a processor configured to perform a predetermined application process on the basis of the input image acquired by the acquiring section. The system may be composed of a plurality of devices or may be composed of a single device.

A system according to a third embodiment includes a camera, an acquiring section, an input image display section, a setter, a region display section, a determiner, and a display form controller. The acquiring section acquires an input image captured by the camera. The input image display section displays the input image acquired by the acquiring section, on a display section. The setter sets a fixed region which is smaller than an imaging range of the camera and fixed to the imaging range. The region display section displays a region image indicating the fixed region, on the display section. The determiner determines whether at least a part of an object included in the input image protrudes from the fixed region. The display form controller controls a display form of an image to be displayed on the display section, on the basis of a result of the determination by the determiner.

According to the above, for example, a user can be caused to recognize whether the object protrudes from the fixed region, and can be caused to recognize that the object deviates from the imaging range of the camera.

In another configuration, the camera may capture an image in a side surface direction of the system.

A system according to a fourth embodiment includes a camera, an acquiring section, a detector, a processor, a condition determiner, and a warning section. The acquiring section acquires an input image captured by the camera. The detector detects a specific object included in the input image acquired by the acquiring section. The processor performs predetermined information processing if the specific object has been detected by the detector. The condition determiner determines whether a predetermined condition is satisfied, on the basis of the input image. The warning section issues a warning if it is determined by the condition determiner that the predetermined condition is satisfied when the specific object has been detected by the detector. The processor performs the predetermined information processing on the basis of the input image even if it is determined by the condition determiner that the predetermined condition is satisfied.

According to the above, for example, even when the specific object has been detected, if it is determined on the basis of the input image that the predetermined condition is satisfied, a warning can be issued. For example, a warning can be previously issued to a user before the predetermined information processing based on the input image is no longer performed.

In another configuration, the system may further include a second warning section configured to issue a warning different from the warning by the warning section if the specific object has not been detected by the detector.

In another configuration, the system may further include a stop section configured to stop the predetermined information processing by the processor if the specific object has not been detected by the detector.

According to the present embodiment, when displaying, on the display section, an image captured by the camera which captures an image in the side surface direction, the image can be displayed so as to be inclined in the predetermined direction, and, for example, a display that is easily viewable by the user can be performed.

An electronic apparatus according to a fifth embodiment is a hand-held electronic apparatus including a camera, an acquiring section, and a controller. The camera captures an image in a side surface direction of the electronic apparatus. The acquiring section acquires an input image captured by the camera. The controller performs control of at least any one of start, temporary stop, and restart of an application on the basis of the input image acquired by the acquiring section.

According to the above, start, temporary stop, and restart of the application can be controlled on the basis of the image captured by the camera which captures an image in the side surface direction.

In the fifth embodiment, the application may be an interactive type application in which a process is performed in accordance with an input performed by a user.

According to the above, start, temporary stop, and restart of the interactive type application can be controlled.

In the fifth embodiment, the electronic apparatus may further include an application controller configured to control progress of the application being presently executed, on the basis of the input image acquired by the acquiring section.

According to the above, on the basis of the input image captured by the camera, start, temporary stop, and restart of the application can be controlled and progress of the application can also be controlled, and an operation section does not need to be switched for any of stop, temporary stop, and restart of the application and for progress of the application, so that user's convenience can be improved.

In the fifth embodiment, the electronic apparatus may further include a detector configured to detect an object on the basis of the input image acquired by the acquiring section. The controller performs the control of the application on the basis of a result of the detection of the object by the detector.

According to the above, the object can be detected on the basis of the input image, and the control of the application can be performed on the basis of the result of the detection.

In the fifth embodiment, the detector may detect a hand of a user.

According to the above, the hand of the user can be detected on the basis of the input image, and the control of the application can be performed on the basis of the result of the detection of the hand.

In the fifth embodiment, the detector may detect a gesture made by the hand of the user. The controller performs the control of the application on the basis of the gesture detected by the detector.

According to the above, start, temporary stop, and restart of the application can be controlled through the gesture.

In the fifth embodiment, the controller may start the application if the object has been detected by the detector.

According to the above, the application can be started if the object has been detected.

In the fifth embodiment, the controller may temporarily stop the application being presently executed, if the object has not been detected by the detector.

According to the above, the application being presently executed can be temporarily stopped if the object has not been detected.

In the fifth embodiment, the controller may temporarily stop the application if a predetermined period has elapsed from a time when the object is no longer detected by the detector.

According to the above, the application can be temporarily stopped if the predetermined period has elapsed from the time when the object is no longer detected. Accordingly, for example, the application can be controlled as intended by the user.

In the fifth embodiment, after the application being presently executed is temporarily stopped, if the object is detected by the detector, the controller may restart the temporarily stopped application.

According to the above, even when the application is temporarily stopped without the object being detected, if the object is detected, the application can be restarted.

In the fifth embodiment, the controller may start or restart a second application different from the application being presently executed, if the object has not been detected by the detector.

According to the above, if the object has not been detected, the second application different from the application being presently executed can be started or restarted.

In the fifth embodiment, the controller may start or restart the application that has been executed before the second application is started, if the object has been detected by the detector.

According to the above, if the object has been detected after the application is started without the object being detected, the application that has been executed before the second application is started can be started or restarted.

In the fifth embodiment, the detector may detect whether the electronic apparatus is held by the user, on the basis of the input image, and the controller may start the application if the detector detects that the electronic apparatus is held by the user.

According to the above, the application can be started if the electronic apparatus is held.

In the fifth embodiment, the electronic apparatus may further include an application controller configured to control progress of the application being presently executed, on the basis of the result of the detection of the object by the detector.

According to the above, progress of the application can be controlled on the basis of the result of the detection of the object.

In the fifth embodiment, the electronic apparatus may further include a distance calculator configured to calculate a distance between the object and the camera on the basis of the input image. The controller performs the control of the application on the basis of the distance calculated by the distance calculator.

According to the above, the application can be controlled on the basis of the distance to the object.

In the fifth embodiment, the electronic apparatus may further include a speed calculator configured to calculate a speed of the object on the basis of the input image. The controller performs the control of the application on the basis of the speed calculated by the speed calculator.

According to the above, the application can be controlled on the basis of the speed of the object.

In the fifth embodiment, the electronic apparatus may further include a notifier configured to notify the user that the application is temporarily stopped, when the application is temporarily stopped by the controller.

According to the above, the user can be notified when the application is temporarily stopped.

In the fifth embodiment, the electronic apparatus may further include a selector configured to select any application from among a plurality of applications in accordance with an input performed by the user. The controller starts the application already selected by the selector.

According to the above, any application can be selected from among the plurality of applications and started.

In the fifth embodiment, the detector may include: a first determiner configured to determine whether a first condition regarding detection of the object is satisfied; and a second determiner configured to determine whether a second condition which is stricter than the first condition is satisfied. If the first condition is satisfied, the controller performs a first process regarding start or end of the application but does not perform a second process subsequent to the first process. If the second condition is satisfied, the controller performs the first process and the second process in the application.

According to the above, the first process regarding start or end of the application and the second process can be performed on the basis of the first condition regarding detection of the object and the second condition which is stricter than the first condition. For example, when starting the application, if the first condition is satisfied and the second condition is not satisfied, the application is started, but a predetermined process in the application is not started. If the second condition is satisfied, the predetermined process in the application is started. In addition, for example, when ending the application, if the first condition is satisfied and the second condition is not satisfied, the application is temporarily stopped, but the application is not ended. If the second condition is satisfied, the application is ended.

In the fifth embodiment, when the application is temporarily stopped, the controller may receive an instruction made by the user regarding whether to end the application, and may end the application in accordance with the instruction made by the user.

According to the above, after the application is temporarily stopped, the application can be ended in accordance with the instruction made by the user.

In the fifth embodiment, when the application is temporarily stopped, the controller may end the application in accordance with elapse of a predetermined time.

According to the above, after the application is temporarily stopped, the application can be ended in accordance with the elapse of the predetermined time.

In the fifth embodiment, the camera may be an infrared camera.

In the fifth embodiment, the camera may be proved at a side surface of the electronic apparatus.

An electronic apparatus according to a sixth embodiment includes an acquiring section, an application executor, and a controller. The acquiring section acquires an input image captured by a camera. The application executor executes an interactive type application which progresses on the basis of an operation performed by a user. The controller temporarily stops the application being presently executed, on the basis of the input image acquired by the acquiring section.

According to the above, the application being presently executed can be temporarily stopped on the basis of the input image captured by the camera.

An electronic apparatus according to a seventh embodiment includes a camera configured to capture an image in a side surface direction of the electronic apparatus, an acquiring section, and an application activator. The acquiring section acquires an input image captured by the camera. The application activator activates an application on the basis of the input image acquired by the acquiring section.

According to the above, the application can be activated on the basis of the input image captured by the camera.

According to the present embodiment, the application can be controlled on the basis of the input image from the camera.

These and other objects, features, aspects and advantages of the exemplary embodiments will become more apparent from the following detailed description when taken in conjunction with the accompanying drawings.

BRIEF DESCRIPTION OF THE DRAWINGS

FIG. 13 is an example non-limiting diagram showing a composite image 41 obtained by combining a contour image 21 and a guide frame image 22 in the state shown FIG. 11;

FIG. 14 is an example non-limiting diagram showing the composite image 41 obtained by combining the contour image 21 and the guide frame image 22 in the state shown FIG. 12;

FIG. 15 is an example non-limiting schematic diagram showing an example of a process for performing a perspective display;

FIG. 16 is an example non-limiting diagram showing an example of a menu screen displayed on a display 2 of the portable electronic apparatus 1;

FIG. 17 is an example non-limiting diagram showing a state where an application B selected through the menu screen has been activated;

FIG. 18 is an example non-limiting diagram showing an example of a screen immediately after a game of the activated application B is started;

DETAILED DESCRIPTION OF NON-LIMITING EXAMPLE EMBODIMENTS

Figure 1:
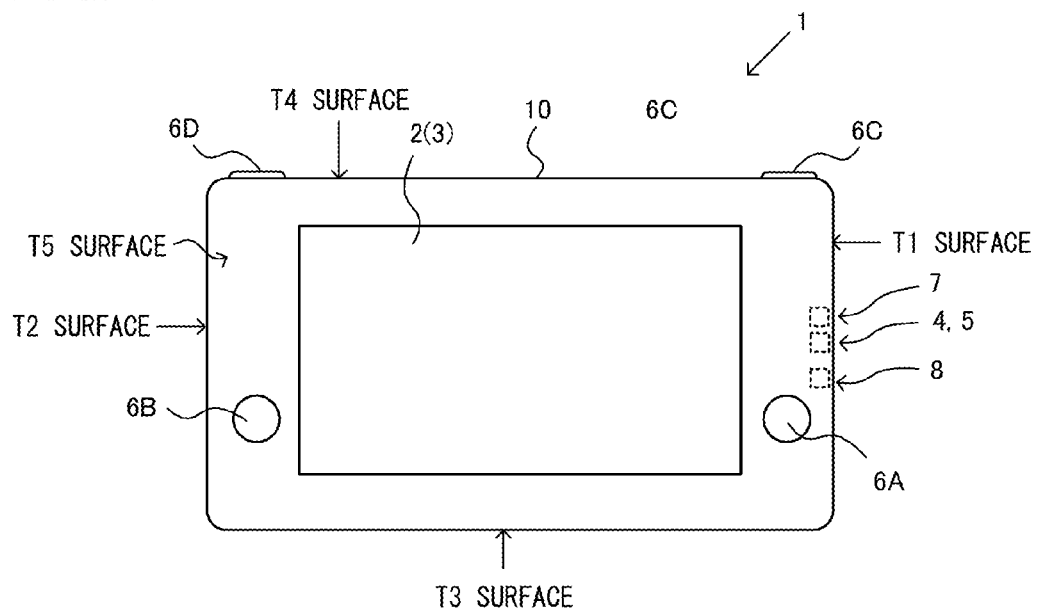
FIG. 1 is an example non-limiting front view of a portable electronic apparatus 1 according to an exemplary embodiment.
Figure 2:
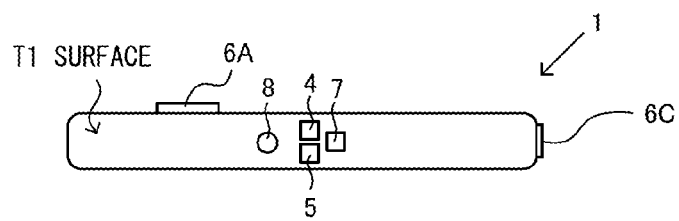
FIG. 2 is an example non-limiting right side view of the portable electronic apparatus 1.
Figure 3:
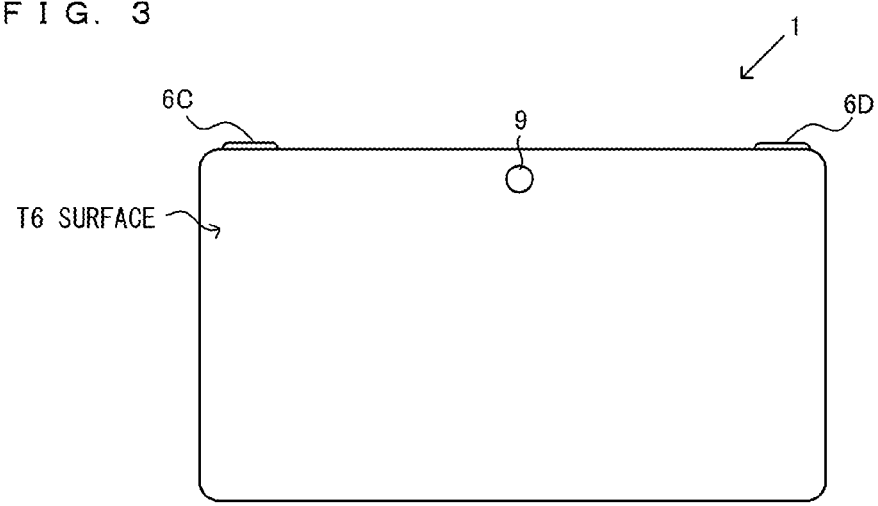
FIG. 3 is an example non-limiting rear view of the portable electronic apparatus 1.

Hereinafter, a portable electronic apparatus according to an exemplary embodiment will be described. The portable electronic apparatus is a hand-held information processing apparatus which can be held with hands and operated by a user, and may be, for example, a game apparatus, or may be any apparatus such as a mobile phone (smartphone, etc.), a tablet terminal, a camera, a watch-type terminal, or the like. FIG. 1 is a front view of a portable electronic apparatus 1 according to the present embodiment. FIG. 2 is a right side view of the portable electronic apparatus 1. FIG. 3 is a rear view of the portable electronic apparatus 1.

As shown in FIG. 1, the portable electronic apparatus 1 includes a display 2, a touch panel 3, an infrared camera 4, a distance measuring sensor 5, an input button 6 (6A to 6D), an irradiation section 7, and a projector 8, and these components are housed in a housing 10. The housing 10 (the portable electronic apparatus 1) has a plate-like shape and has a size small enough to be held with one hand or both hands of the user.

As the display 2, for example, a liquid crystal display device, an organic EL display device, or the like is used. In addition, any display device may be used. The screen of the display 2 is provided so as to be exposed on a front surface (T5 surface) of the housing 10. The touch panel 3 is provided on the screen of the display 2 and detects a position, on the screen, which is touched by the user. As the touch panel 3, one capable of detecting a single point or one capable of detecting multiple points is used, and any touch panel such as an electrostatic capacitance type, a resistive film type, or the like may be used.

The input buttons 6A to 6D accept an input (pressing) performed by the user. Each of the input buttons 6A to 6D is provided at a position which a finger of the user reaches when the user holds both ends of the portable electronic apparatus 1. Specifically, each of the input buttons 6A and 6C is located at a position which a finger of the right hand of the user reaches when the user holds the portable electronic apparatus 1 with their right hand, the input button 6A is provided at a position which the thumb of the right hand reaches, and the input button 6C is provided at a position which the index finger or the middle finger of the right hand reaches. In addition, each of the input buttons 6B and 6D is located at a position which a finger of the left hand of the user reaches when the user holds the portable electronic apparatus 1 with their left hand, the input button 6B is located at a position which the thumb of the left hand reaches, and the input button 6D is located at a position which the index finger or the middle finger of the left hand reaches. As shown in FIG. 1, the input buttons 6A and 6B are provided on the front surface (T5 surface) of the housing 10, and the input buttons 6C and 6D are provided on an upper side surface (T4 surface) of the housing 10. As an input section which accepts an input performed by the user, a cross key, an analog stick, or the like for a direction input may be provided in addition to the input buttons 6A to 6D.

The infrared camera 4 includes a lens and a sensor which senses light (infrared light, specifically, near-infrared light). The sensor of the infrared camera 4 is an image sensor in which elements that sense infrared light are arranged in rows and columns, and each element of the image sensor receives infrared light and converts the infrared light into an electric signal, thereby outputting a two-dimensional infrared image.

Light (e.g., infrared light) emitted from a light source provided in the distance measuring sensor 5 is reflected on an object. The distance measuring sensor 5 measures the distance to the object by its light receiving element receiving the reflected light. As the distance measuring sensor 5, any type of sensor such as a triangulation type sensor or a TOF (Time Of Flight) type sensor may be used. As the light source of the distance measuring sensor 5, an LED, a laser diode, or the like which emits infrared light in a specific direction is used.

The irradiation section 7 emits infrared light at a predetermined time interval (e.g., a ⅟60 sec interval). The irradiation section 7 emits infrared light in synchronization with timing at which the infrared camera 4 captures an image. The irradiation section 7 emits infrared light to a predetermined range in a right side surface direction of the portable electronic apparatus 1. The infrared light emitted by the irradiation section 7 is reflected on an object and, the reflected infrared light is received by the infrared camera 4, whereby an image of the infrared light is obtained. The irradiation section 7 may be used for capturing an infrared image by the infrared camera 4 and measuring a distance by the distance measuring sensor 5. That is, using the infrared light from the irradiation section 7, an image may be captured by the infrared camera 4 and also a distance may be measured by the distance measuring sensor 5.

The projector 8 includes a light source which emits visible light, and projects a character, an image, or the like onto a projection surface (a screen, a hand of the user, etc.) by using light from the light source.

The infrared camera 4, the distance measuring sensor 5, the irradiation section 7, and the projector 8 are provided at a side surface (e.g., a right side surface: T1 surface) of the housing 10. Specifically, the imaging direction (optical axis) of the infrared camera 4 is directed in a direction perpendicular to the right side surface. The detection direction of the distance measuring sensor 5 and a direction in which the projector 8 emits light are also similarly directions perpendicular to the right side surface. That is, when the user holds the portable electronic apparatus 1 with their left hand, the infrared camera 4 captures an image of a space in the right side surface direction of the portable electronic apparatus 1, and the distance measuring sensor 5 measures the distance to an object present in the space in the right side surface direction of the portable electronic apparatus 1. In addition, the projector 8 projects an image or the like by emitting visible light in the same direction as those of the infrared camera 4 and the distance measuring sensor 5.

An outer camera 9 is provided at a back surface (T6 surface) of the portable electronic apparatus 1 (FIG. 3). The outer camera 9 is typically capable of capturing an image in a direction perpendicular to the imaging direction of the infrared camera 4, that is, in a direction perpendicular to the back surface. The outer camera 9 includes a lens and an image sensor which senses visible light. The outer camera 9 captures an image of a space in a back surface direction as a color image (RGB image). A camera may be provided at the front surface in addition to the outer camera 9 at the back surface. The outer camera 9 at the back surface may not be provided, and a camera may be provided at the front surface (the surface at which the screen of the display 2 is provided).

Figure 4:
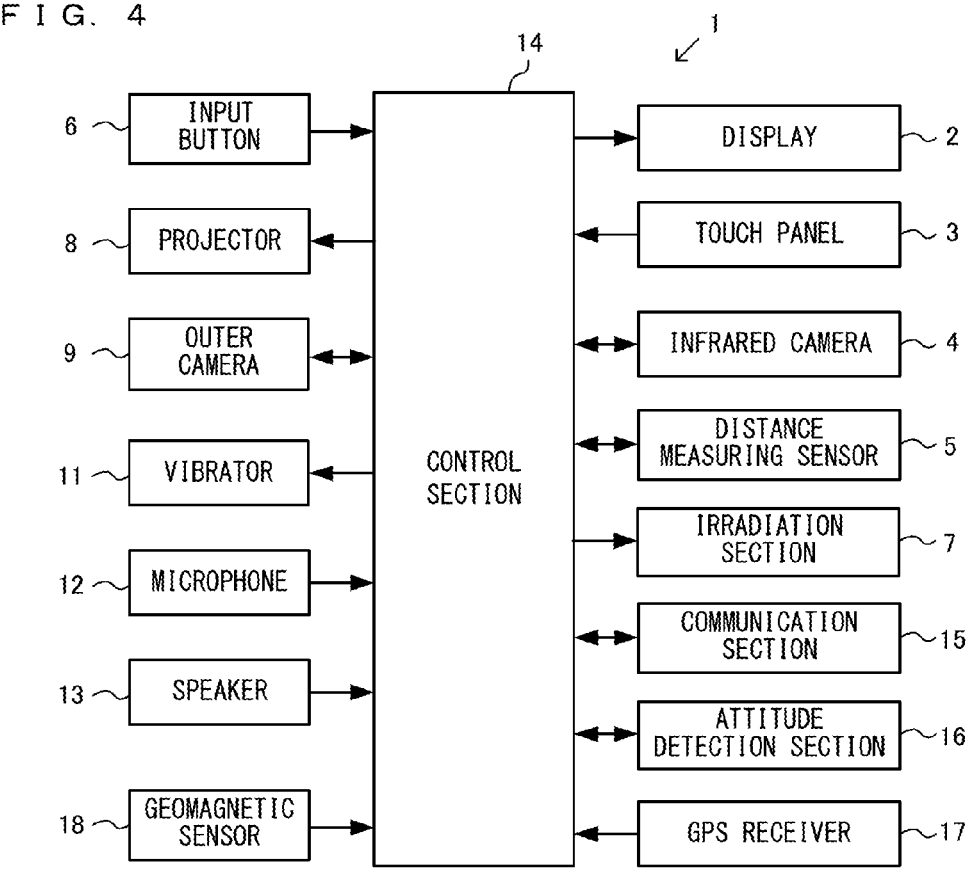
FIG. 4 is an example non-limiting block diagram showing an example of the internal configuration of the portable electronic apparatus 1.

FIG. 4 is a block diagram showing an example of the internal configuration of the portable electronic apparatus 1. As shown in FIG. 4, in addition to each section described above, the portable electronic apparatus 1 includes a vibrator 11, a microphone 12, a speaker 13, a control section 14, a communication section 15, an attitude detection section 16, a GPS receiver 17, and a geomagnetic sensor 18. In addition, the portable electronic apparatus 1 includes a battery which is not shown, and is supplied with power from the battery. These respective sections are housed in the housing 10.

The control section 14 is connected to the respective sections such as the display 2, the touch panel 3, the infrared camera 4, the distance measuring sensor 5, the input button 6, the irradiation section 7, the projector 8, the vibrator 11, the microphone 12, the speaker 13, the communication section 15, the attitude detection section 16, the GPS receiver 17, and the geomagnetic sensor 18, and controls the respective sections.

Specifically, the control section 14 includes a CPU, a memory (RAM), and the like, and performs a predetermined process on the basis of a predetermined program (e.g., application programs for performing game processing, image processing, and various calculations) stored in a storage unit (e.g., a nonvolatile memory, a hard disk, etc.) which is provided in the portable electronic apparatus 1 and not shown. For example, the control section 14 acquires an image from the infrared camera 4 and analyzes the image; calculates the distance to an object on the basis of a signal from the distance measuring sensor 5; and performs a process corresponding to an input signal from the touch panel 3 or the input button 6. The control section 14 generates an image based on a result of a predetermined process, and outputs the image to the display 2. A program for performing the predetermined process may be downloaded from the outside via the communication section 15.

The vibrator 11 operates on the basis of an instruction from the control section 14, to vibrate the entire portable electronic apparatus 1. The vibrator 11 is provided at a predetermined position (e.g., at a center portion within the housing 10 or a position shifted left or right therefrom) from which vibration is easily transmitted to the hands of the user.

The microphone 12 and the speaker 13 are used for inputting and outputting sound. The communication section 15 is used for performing communication with another apparatus by a predetermined communication method (e.g., a wireless LAN, etc.). The attitude detection section 16 is, for example, an acceleration sensor or an angular velocity sensor, and detects the attitude of the portable electronic apparatus 1.

The GPS receiver 17 receives a signal from a GPS (Global Positioning System) satellite, and the portable electronic apparatus 1 can calculate the position of the portable electronic apparatus 1 on the basis of the received signal. For example, when a predetermined operation (e.g., a gesture input using the infrared camera 4 described later, a button input, or a motion of shaking the portable electronic apparatus 1) is performed at a specific position, the portable electronic apparatus 1 may display an object associated with the specific position. For example, in the case where a game is played with the portable electronic apparatus 1, when the portable electronic apparatus 1 is present at a specific position, an object associated with the specific position may be caused to appear in the game.

The geomagnetic sensor 18 is a sensor capable of detecting the direction and the magnitude of magnetism. For example, the portable electronic apparatus 1 determines whether the portable electronic apparatus 1 is directed in a specific direction, on the basis of a detection result of the geomagnetic sensor 18. When a predetermined operation (the above-described gesture input, etc.) is performed in the specific direction, the portable electronic apparatus 1 may display an object. For example, when a game is played with the portable electronic apparatus 1, an object corresponding to the specific direction may be caused to appear in the game. In addition, the portable electronic apparatus 1 may use a combination of GPS information obtained by using the GPS receiver 17 and direction information obtained by using the geomagnetic sensor. For example, when the portable electronic apparatus 1 is present at a specific position and directed in a specific direction, the portable electronic apparatus 1 may display an object corresponding to the specific position and the specific direction, or may cause the object to appear in a game.

Figure 5:
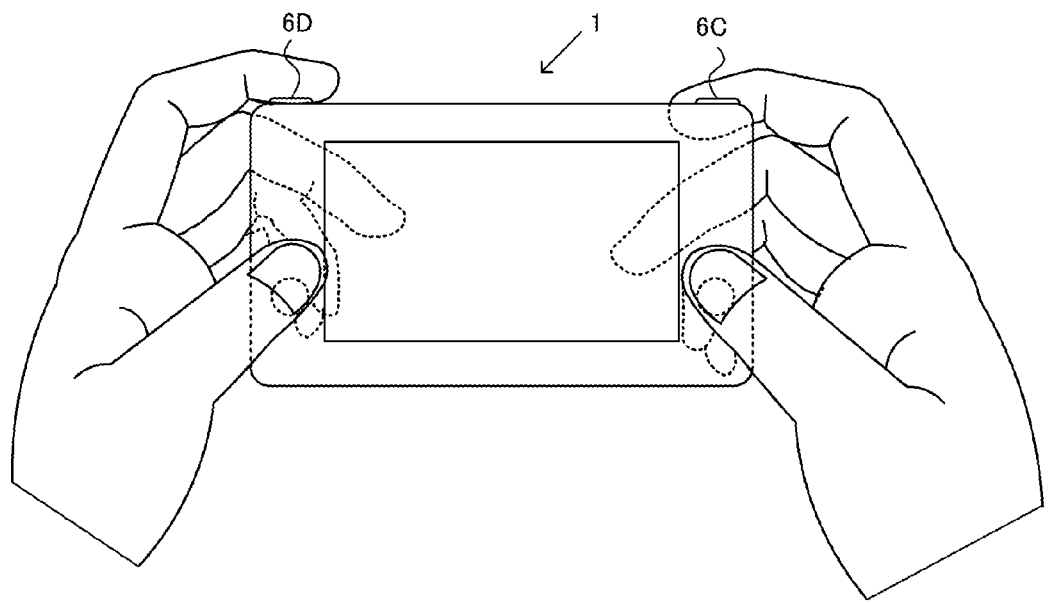
FIG. 5 is an example non-limiting diagram showing an example of a use state of the portable electronic apparatus 1 when a user holds the portable electronic apparatus 1 with both hands.

FIG. 5 is a diagram showing an example of a use state of the portable electronic apparatus 1 when the user holds the portable electronic apparatus 1 with both hands. As shown in FIG. 5, the user holds both left and right end portions of the portable electronic apparatus 1. When the user holds both left and right end portions, the user can press the input button 6B with the thumb of their left hand, and can press the input button 6A with the thumb of their right hand. In addition, when the user holds both left and right end portions, the user can move the index finger or the middle finger of their left hand to press the input button 6D with the index finger or the middle finger of their left hand, and can move the index finger or the middle finger of their right hand to press the input button 6C with the index finger or the middle finger of their right hand.

Next, an input with respect to the portable electronic apparatus 1 will be described. In the present embodiment, the user can perform a gesture input with respect to the portable electronic apparatus 1 by using their right hand in a state of holding the portable electronic apparatus 1 with their left hand.

Figure 6A:
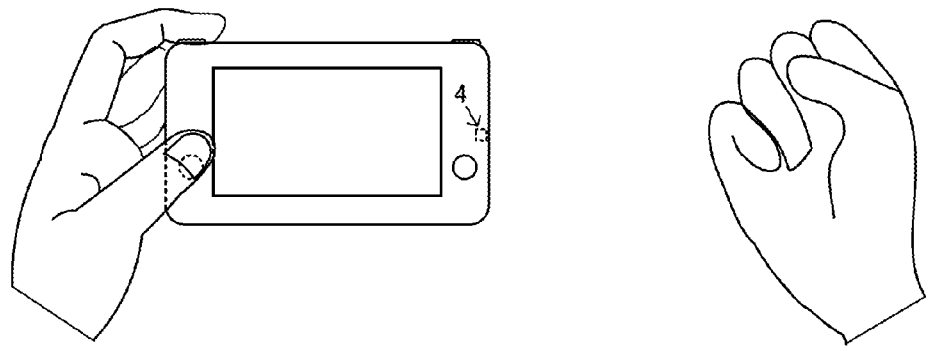
FIG. 6A is an example non-limiting diagram showing a state where the user performs a gesture input by using their right hand in a right side surface direction of the portable electronic apparatus 1.
Figure 6B:
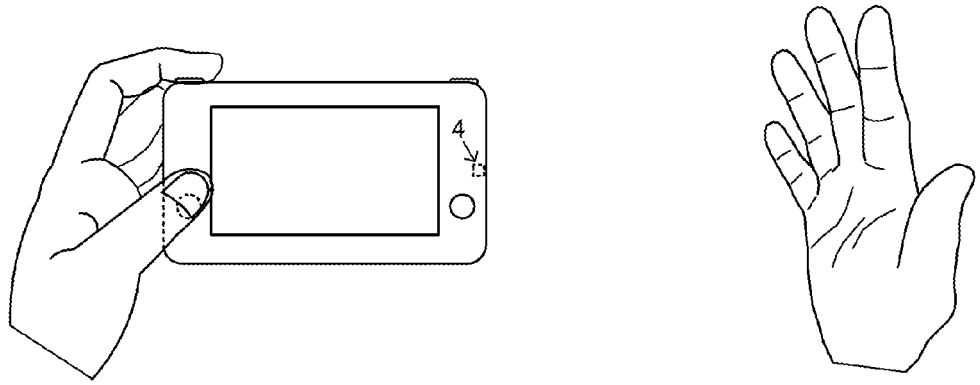
FIG. 6B is an example non-limiting diagram showing a state where the user performs a gesture input by using their right hand in the right side surface direction of the portable electronic apparatus 1.
Figure 7A:
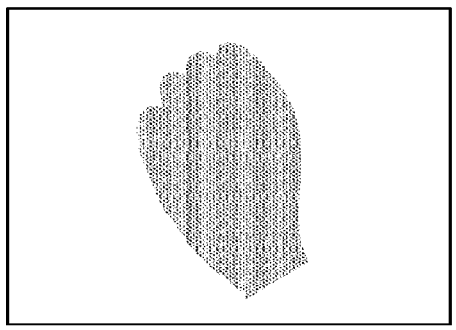
FIG. 7A is an example non-limiting diagram showing an example of an image captured by an infrared camera 4 when the gesture input shown in FIG. 6A is performed.
Figure 7B:
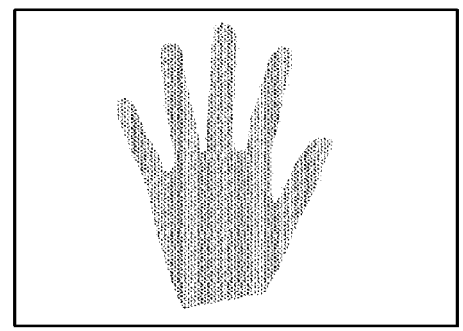
FIG. 7B is an example non-limiting diagram showing an example of an image captured by the infrared camera 4 when the gesture input shown in FIG. 6B is performed.

FIGS. 6A and 6B are each a diagram showing a state where the user performs a gesture input by using their right hand in the right side surface direction of the portable electronic apparatus 1. FIG. 7A is a diagram showing an example of an image captured by the infrared camera 4 when the gesture input shown in FIG. 6A is performed. FIG. 7B is a diagram showing an example of an image captured by the infrared camera 4 when the gesture input shown in FIG. 6B is performed.

As shown in FIGS. 6A and 6B, the user performs various gesture inputs by using their right hand at a position in the right side surface direction of the portable electronic apparatus 1. The portable electronic apparatus 1 captures an infrared image by the infrared camera 4 provided at the right side surface of the portable electronic apparatus 1, and analyzes the captured infrared image, thereby identifying a gesture input performed by the user.

Specifically, when the image shown in FIG. 7A or 7B is acquired from the infrared camera 4, the portable electronic apparatus 1 detects a specific object (specifically, a human hand) included in the acquired image, and identifies the type of a gesture made by the user, on the basis of the shape or the like of the specific object. For example, the portable electronic apparatus 1 determines whether an object having a predetermined shape is present in the acquired image, through pattern matching or the like. For example, when the image shown in FIG. 7A is acquired, the portable electronic apparatus 1 can recognize "rock" on the basis of the number of raised fingers. When the image shown in FIG. 7B is acquired, the portable electronic apparatus 1 can recognize "paper" on the basis of the number of raised fingers. Then, the portable electronic apparatus 1 performs a process corresponding to the type of the gesture as described later.

Here, examples of gestures to be identified include body gestures and hand gestures using a part or the entirety of the body such as the hands and the face of the user, and the portable electronic apparatus 1 may recognize, as a gesture input, a state where a hand or the like remains still, or may recognize, as a gesture input, a series of motions using a hand. In addition, the portable electronic apparatus 1 may recognize a gesture input performed in a state where the user holds an object. In this case, the portable electronic apparatus 1 may recognize, as a gesture input, a state where only the object held by the user remains still or is moved, or may recognize, as a gesture input, a state where both the hand of the user and the object remain still or are moved.

When an infrared image captured by the infrared camera 4 includes a plurality of objects, the portable electronic apparatus 1 may detect only a specific object among the plurality of objects and may perform a process on the basis of the detected object. For example, when an image of a hand of the user is captured by using the infrared camera 4, the hand and an object behind the hand may be included in the infrared image. In this case, the portable electronic apparatus 1 may recognize only the hand of the user. For example, the portable electronic apparatus 1 may take out only an image of an object having the highest average brightness among a plurality of objects included in an infrared image captured by the infrared camera 4 and may analyze the image of the object, thereby recognizing the hand of the user. In addition, the portable electronic apparatus 1 may recognize only the hand of the user on the basis of pattern matching or the like from images of the plurality of objects included in the infrared image captured by the infrared camera 4.

In the present embodiment, the user performs various operations on the portable electronic apparatus 1 by making gestures using their right hand in, for example, the right side surface direction of the portable electronic apparatus 1. First, the user needs to recognize whether the present state is a state where an image of their right hand is properly captured by the infrared camera 4, which is disposed at the right side surface of the portable electronic apparatus 1, so that a gesture input is possible. Thus, in the present embodiment, a guide indication for causing the user to recognize a position where a gesture input is possible (for guiding the hand of the user to a position suitable for a gesture input) is performed. For example, the guide indication is performed prior to execution of an application described later.

(Guide Indication)

Figure 8:
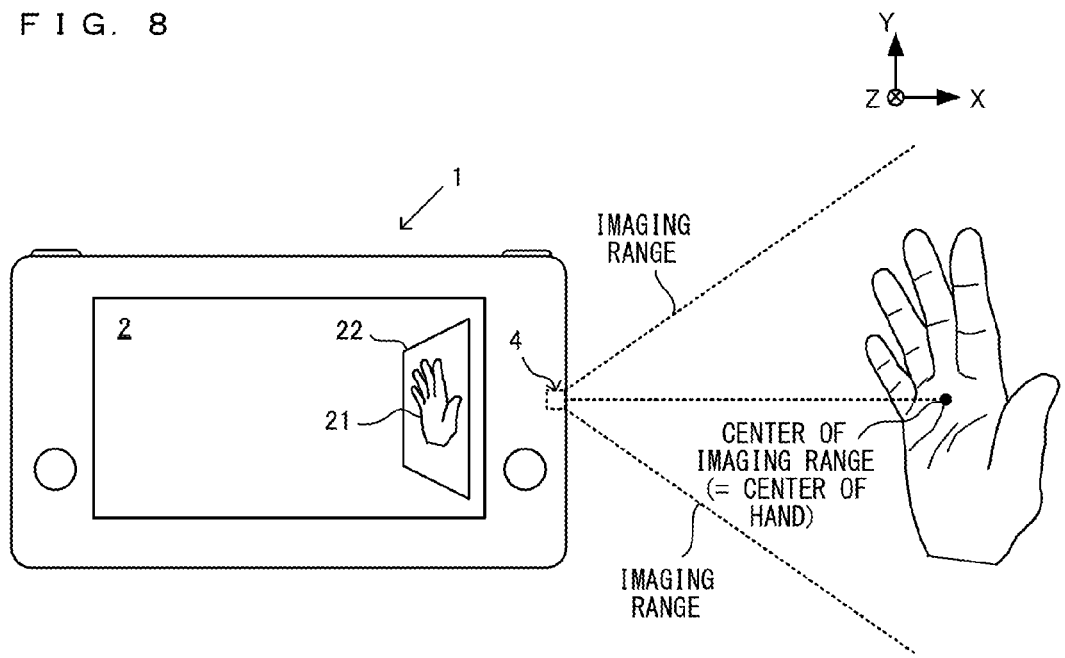
FIG. 8 is an example non-limiting diagram showing an example of a guide indication in the embodiment.

FIG. 8 is a diagram showing an example of the guide indication in the present embodiment. FIG. 8 shows an example of the guide indication in the case where the right hand of the user is present within the imaging range of the infrared camera 4 and an image of the right hand of the user is captured by the infrared camera 4 from the front of the infrared camera.

As shown in FIG. 8, a contour image 21 and a guide frame image 22 are displayed at the right side of the screen of the display 2 as a guide indication for causing the user to recognize a correct gesture input position. The contour image 21 is an image indicating the contour of an image of the hand of the user included in an infrared image captured by the infrared camera 4. The guide frame image 22 is an image for causing the user to recognize the correct gesture input position, and is an image indicating a range smaller than the imaging range where an image is captured by the infrared camera 4.

As shown in FIG. 8, for example, the rightward direction (long side direction) of the portable electronic apparatus 1 is defined as an X axis, the upward direction (short side direction) of the portable electronic apparatus 1 is defined as a Y axis, and the depth direction of the screen of the display 2 is defined as a Z axis. When a straight line extending from the infrared camera 4 in the X axis direction hits substantially the center of the palm of the right hand of the user and the right hand of the user is present at an appropriate position in the X axis direction, an image of the entire right hand of the user is captured by the infrared camera 4.

Figure 9:
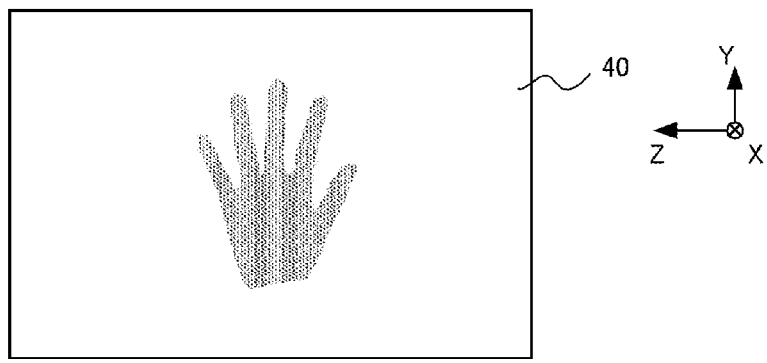
FIG. 9 is an example non-limiting diagram showing an example of an infrared image captured by the infrared camera 4 in a state shown in FIG. 8.
Figure 10:
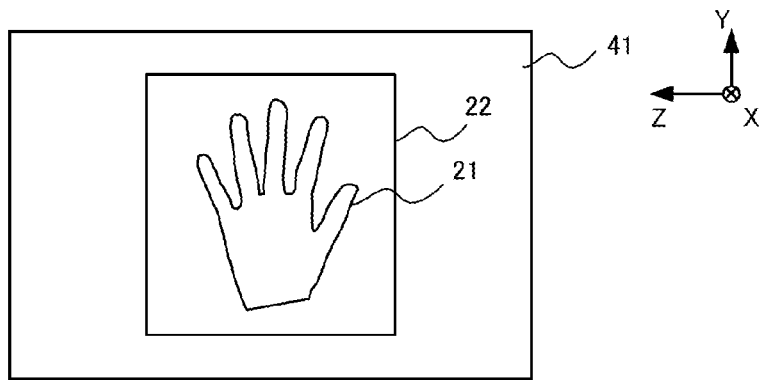
FIG. 10 is an example non-limiting diagram showing an example of an image after a contour rendering process and a guide frame image rendering process are performed in the case where an image shown in FIG. 9 is obtained.

FIG. 9 is a diagram showing an example of an infrared image captured by the infrared camera 4 in a state shown in FIG. 8. FIG. 10 is a diagram showing an example of an image after a contour rendering process and a guide frame image rendering process are performed in the case where the image shown in FIG. 9 is obtained.

As shown in FIG. 9, an infrared image 40 captured by the infrared camera 4 includes an image of the right hand of the user. A composite image 41 shown in FIG. 10 is generated by performing the contour rendering process and the guide frame image rendering process on the captured infrared image 40. Specifically, as shown in FIG. 10, after the infrared image 40 is captured by the infrared camera 4, the portable electronic apparatus 1 detects the contour of the right hand included in the infrared image 40 by, for example, edge detection, and also deletes pixel information of the internal portion other than the contour, thereby generating the contour image 21. In addition, the portable electronic apparatus 1 renders the guide frame image 22 so as to superimpose the guide frame image 22 on the generated contour image 21. Specifically, the guide frame image 22 is an image that is fixed at the image center of the infrared image 40 captured by the infrared camera 4 and shows a quadrangular frame having a certain size.

The composite image 41 obtained by combining the contour image 21 and the guide frame image 22 is displayed on the display 2 so as to be inclined in a predetermined direction. Specifically, as shown in FIG. 8, the portable electronic apparatus 1 makes the composite image 41 into perspective form, and displays the composite image made into perspective form (an image obtained by obliquely viewing the composite image 41) on the display 2. A specific example of a process of making the composite image 41 into perspective form will be described later.

Figure 11:
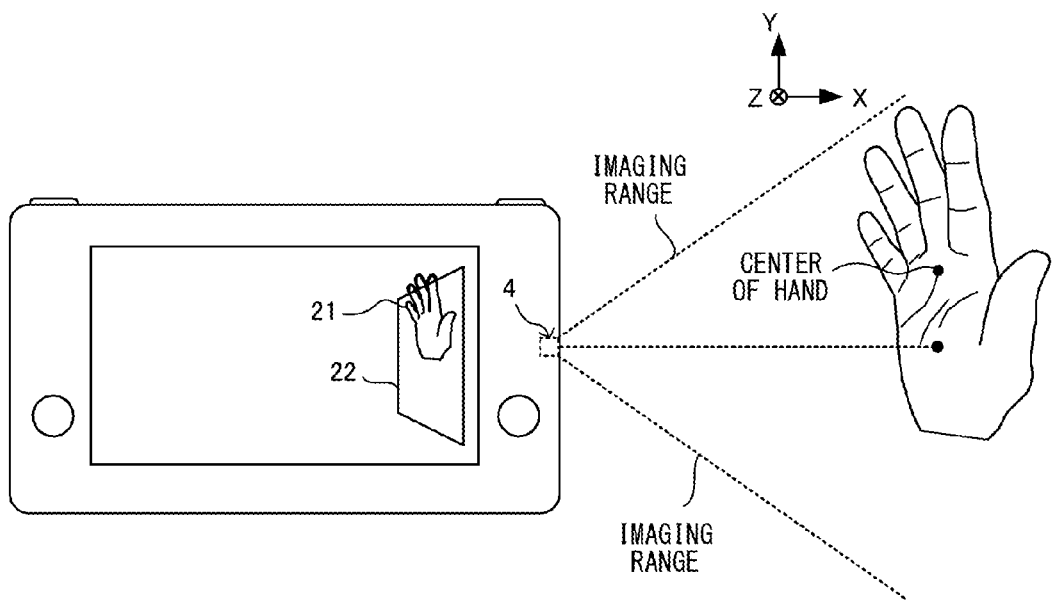
FIG. 11 is an example non-limiting diagram showing a state where a user has moved their hand in the upward direction (Y-axis direction) from the state shown in FIG. 8.
Figure 12:
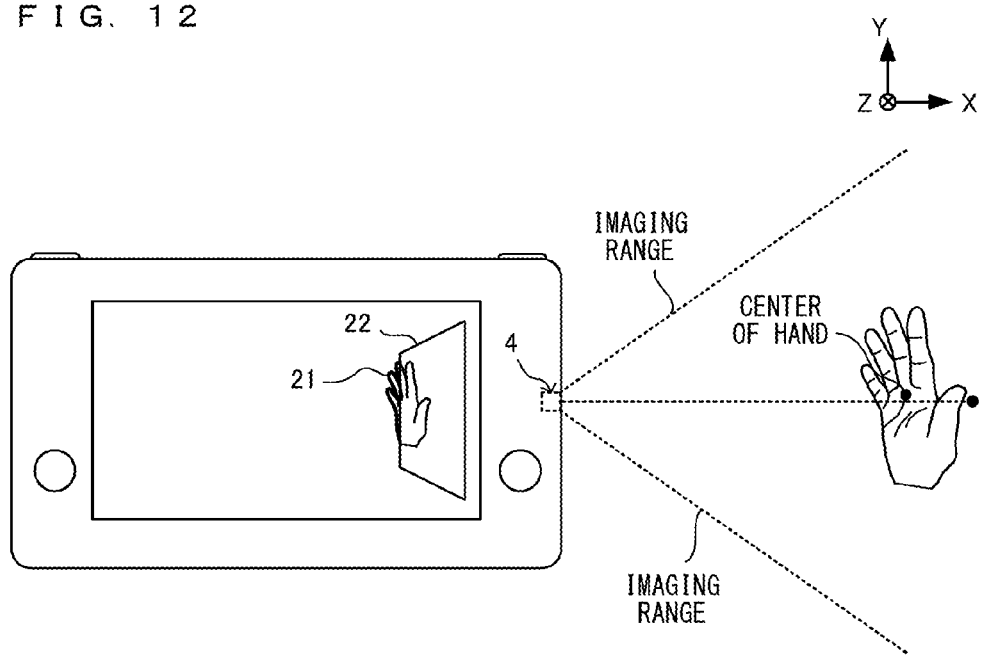
FIG. 12 is an example non-limiting diagram showing a state where the user has moved their hand in the depth direction (Z-axis direction) from the state shown in FIG. 8.

Here, when the user moves their right hand from the state shown in FIG. 8, the image displayed on the display 2 changes. FIG. 11 is a diagram showing a state where the user has moved their hand in the upward direction (Y-axis direction) from the state shown in FIG. 8. FIG. 12 is a diagram showing a state where the user has moved their hand in the depth direction (Z-axis direction) of the screen from the state shown in FIG. 8.

As shown in FIG. 11, when the center of the hand of the user is present above the center of the imaging range of the infrared camera 4, an image in which a part of the contour image 21 protrudes upward from the guide frame image 22 is displayed on the display 2. In addition, as shown in FIG. 12, when the center of the hand of the user is present at the left side with respect to the center of the imaging range of the infrared camera 4 (at the Z-axis direction side in FIG. 12), an image in which a part of the contour image 21 protrudes leftward from the guide frame image 22 is displayed on the display 2. Here, as shown in FIGS. 11 and 12, the protruding part of the contour image 21 from the guide frame image 22 is displayed in a display form different from that of a part of the contour image 21 that fits into the guide frame image 22. For example, the protruding part of the contour image 21 from the guide frame image 22 is displayed in a different color or by a thick line.

FIG. 13 is a diagram showing the composite image 41 obtained by combining the contour image 21 and the guide frame image 22 in the state shown in FIG. 11. FIG. 14 is a diagram showing the composite image 41 obtained by combining the contour image 21 and the guide frame image 22 in the state shown in FIG. 12.

As shown in FIG. 13, when the hand of the user is present above the center of the infrared image (the center of the imaging range of the infrared camera 4), a part of the contour of the hand of the user protrudes upward from the guide frame image 22. In addition, as shown in FIG. 14, when the hand of the user is present at the left side with respect to the center of the infrared image, a part of the contour of the hand of the user protrudes leftward from the guide frame image 22. The protruding parts are displayed in a display form (e.g., red) different from that of the other part that does not protrude (e.g., black). After such composite images 41 are generated, these images are made into perspective form and displayed on the display 2 (the composite images 41 are displayed in perspective form as shown in FIGS. 11 and 12).

Since the image made into perspective form (an image obtained by obliquely viewing the composite image 41) is displayed as described above, it is easy for the user to recognize a position in the depth direction, and the user can easily recognize whether their hand is within the imaging range of the infrared camera 4. That is, the image made into perspective form is such an image that is similar to that when the user directly sees their hand, thus it is easy for the user to recognize the depth direction, and the user can easily recognize at which position in the depth direction their hand is presently located.

Since the guide frame image 22 fixed to the imaging range of the infrared camera 4 is displayed, the user easily adjusts the position of their hand such that the hand is within the guide frame image 22. In addition, since the protruding part from the guide frame image 22 is displayed in a form different from that of the part within the guide frame image 22, the user can easily recognize that their hand is outside the guide frame image 22, and it is made easy for the user to adjust the position of their hand.

The guide frame image 22 is smaller than the infrared image captured by the infrared camera 4. Thus, even when the hand of the user protrudes from the guide frame image 22, if the hand (fingers) of the user is included in the infrared image captured by the infrared camera 4, the portable electronic apparatus 1 can recognize a gesture made by the user. By displaying the guide frame image 22, it is possible to warn the user against the user's hand coming out of the imaging range of the infrared camera 4, before it becomes impossible to recognize a gesture made by the user.

In the present embodiment, an image in the right side surface direction of the portable electronic apparatus 1 is captured by the infrared camera 4 and displayed at the right side of the screen of the display 2. That is, an image in a side surface direction of the portable electronic apparatus 1 is captured by the infrared camera 4 and displayed on the screen of the display 2 and at the same side as the side surface direction in which the image is captured by the infrared camera 4. Thus, it is easy for the user to intuitively recognize the position of their hand.

As described above, in the present embodiment, the guide indication is performed (the contour image 21 and the guide frame image 22 are displayed). Thus, the user can be caused to recognize a correct gesture input position. That is, by performing the guide indication as described above, the user can be caused to recognize whether their hand is present at an appropriate position.

Here, an example of a process for performing a perspective display as shown in FIGS. 8, 11, and 12 will be described.

FIG. 15 is a schematic diagram showing the example of the process for performing the perspective display. As shown in FIG. 15, the contour image 21 and the guide frame image 22 are located at predetermined positions in a virtual space. For example, each point forming the contour image 21 and each point forming the guide frame image 22 are plotted on a yz plane in the virtual space that is defined by an x axis, a y axis, and a z axis. These respective points are moved in parallel in the x-axis direction to form a contour image 21' and a guide frame image 22'. Projection transformation of these moved respective points (the contour image 21' and the guide frame image 22') is performed, whereby an image made into perspective form is displayed on the display 2. Specifically, a virtual camera 50 is located on the yz plane, the imaging direction of the virtual camera 50 (a cz-axis direction) is set so as to be parallel to the z axis, and the upward direction of the virtual camera 50 (a cy-axis direction) is set so as to be parallel to the y axis. An image obtained by capturing the contour image 21' and the guide frame image 22' with such a virtual camera 50 is displayed on the display 2.

The process for the perspective display is not limited to the process shown in FIG. 15. For example, the composite image 41 obtained by combining the contour image 21 and the guide frame image 22 may be rotated about a vertical axis (the Y axis in FIG. 8) by a predetermined angle, and displayed on the display 2, whereby an image obtained by making the composite image 41 into perspective form may be displayed.

In the above-described embodiment, the contour image 21 indicating the contour of the image of the hand included in the infrared image captured by the infrared camera 4 is displayed on the display 2. However, the contour may not be displayed, and the infrared image captured by the infrared camera 4 may be displayed on the display 2 in perspective form as it is. In addition, the infrared image captured by the infrared camera 4 may not be displayed on the display 2 as it is, and may be abstracted and displayed on the display 2 in perspective form. The present disclosure is not limited to displaying the contour of the hand as described above. For example, by displaying a bone connecting characteristic points of a captured image of the hand (line sections connecting the characteristic points), the infrared image captured by the infrared camera 4 may be abstracted and displayed, or the infrared image may be abstracted by another method.

In the above-described embodiment, by displaying the protruding part of the contour of the image of the hand from the guide frame image 22 in a specific form different from that of the other part, the user is notified that their hand protrudes from the guide frame. In another embodiment, when the hand of the user protrudes from the guide frame, the user may be warned by displaying the entire image of the hand (or the protruding part) in a specific form. Alternatively, when the hand of the user protrudes from the guide frame image 22, the user may be warned by displaying the guide frame image 22 in a specific form different from an ordinary form in addition to or instead of the image of the hand. Here, the specific form is not limited to making the color different from an ordinary color or changing the thickness of the line as described above. For example, the display form may be made different from the ordinary form by blinking. In addition, when the hand of the user protrudes from the guide frame, the user may be warned by another image, letters, a sound, vibration (vibration to the hand (left hand) holding the portable electronic apparatus 1), or light emitted from the projector 8 (an LED lamp may be used), etc.

In the above-described embodiment, the infrared image captured by the infrared camera 4 is made into perspective form and displayed on the display 2. However, in another embodiment, the captured image (or an image obtained by abstracting the captured image) may be displayed without being made into perspective form. That is, the captured image may be displayed in any form as long as the captured image is displayed in such a form as to allow the user to recognize a relative position of their hand relative to the portable electronic apparatus 1. For example, a range image indicating the imaging range where an image is captured by the infrared camera 4 may be displayed on the display 2, and an image indicating the position of the hand of the user is displayed so as to be superimposed on the range image (or without superimposing the image on the range image), thereby indicating at which position in the imaging range the hand of the user is present. For example, in order for the user to easily recognize the position of their hand in the depth direction, a range image indicating a position in the depth direction may be displayed, and an image indicating the position of the hand may be displayed so as to be superimposed on the range image (or without superimposing the image on the range image). Specifically, for example, from the infrared image captured by the infrared camera 4, a predetermined position (e.g., the center of gravity) on the hand of the user in the captured image is calculated. A range image indicating a range of the infrared image in the right-left direction (the Z-axis direction in FIG. 9) is displayed, and an image indicating the position of the hand is displayed at the calculated position. Thus, the user can be caused to recognize at which position in the depth direction (Z-axis direction) the hand of the user is located.

The above-described guide indication is performed prior to execution of the application described later. However, the guide indication may be performed or may not be performed, in accordance with a status of execution of information processing performed by the portable electronic apparatus 1. For example, the guide indication may be performed constantly during execution of the application described later, or display/non-display of the guide indication may be switched by an instruction made by the user. Alternatively, the guide indication may be performed when the user makes an instruction for execution of a program for performing the guide indication. Still alternatively, the guide indication may be performed only at the time of setting the portable electronic apparatus 1 or at the time of a tutorial for teaching the user how to use the portable electronic apparatus 1.

In the above-described embodiment, as a prior warning before it becomes impossible to recognize the hand of the user, when the hand of the user protrudes from the guide frame image 22, the protruding part is displayed in a specific form. Specifically, even when it is possible to recognize the hand of the user from the infrared image captured by the infrared camera 4, if the hand of the user protrudes from the guide frame, a prior warning is issued to the user by displaying the protruding part from the guide frame image 22 in the specific display form as described above. In this case, when it actually becomes impossible to recognize the hand of the user from the infrared image captured by the infrared camera 4, another warning may be issued. For example, a second warning different from the above-described prior warning using the guide frame image 22 may be issued by using a voice, letters, an image, vibration, light, or the like. In addition, in the case where a prior warning is issued by using the above-described guide indication during execution of the application described later, when it becomes impossible to recognize the hand of the user from the infrared image captured by the infrared camera 4, the application may be ended, or may be temporarily stopped as described later, after the second warning is issued (or without issuing the second warning).

In the above-described embodiment, even while the hand of the user is detected, if at least a part of the hand of the user protrudes from the guide frame, a warning is issued to the user. In another embodiment, a condition for issuing a warning is not limited thereto. For example, in another embodiment, on the basis of the image captured by the infrared camera 4, it may be determined whether a predetermined condition under which it becomes impossible to recognize a gesture of the user is satisfied. If the predetermined condition is satisfied, a warning may be issued. For example, the predetermined condition may be that the image captured by the infrared camera 4 is too dark (or too bright), or may be that the level of noise included in the image is equal to or higher than a predetermined level. For example, if the average brightness of the entire image is less than a predetermined value, a warning may be issued, since it becomes impossible to identify a gesture of the user if the brightness decreases to be less than the predetermined value.

The shape and the size of the guide frame are merely an example, and a guide frame having any other shape and size may be set and displayed as a guide frame image. In addition, any image other than the guide image may be displayed. That is, any image may be displayed as long as the image is such an image as to allow the user to recognize whether an object (e.g., the hand of the user) included in the imaging range of the infrared camera 4 is present at an appropriate position. For example, when the hand is present at an appropriate position, a predetermined image may be displayed at the edge of the screen, and when the hand is not present at the appropriate position (when the hand is within the imaging range but outside an appropriate range), the predetermined image may be blinked.

(Application Control)

Next, control of an application based on an infrared image captured by the infrared camera 4 in the portable electronic apparatus 1 will be described. FIG. 16 is a diagram showing an example of a menu screen displayed on the display 2 of the portable electronic apparatus 1. FIG. 17 is a diagram showing a state where an application B selected through the menu screen has been activated.

As shown in FIG. 16, a list of applications that are executable in the portable electronic apparatus 1 is displayed in the menu screen. The portable electronic apparatus 1 may be able to execute any application such as a game application for performing a predetermined game, an application for playing music or video, an application for making a phone conversation, an application for capturing/displaying an image, an application for sending/receiving an e-mail, a message, or the like, a browser application for viewing a Web page on the Internet, and an application for creating or editing a document. In addition, the portable electronic apparatus 1 may be able to execute a program for setting the portable electronic apparatus 1 through the menu screen.

The user selects an icon corresponding to a desired application from among icons indicating a plurality of applications displayed in the menu screen. For example, the user may be allowed to select an application by using an input button, or may be allowed to select an application by performing a touch operation on the touch panel 3 with their finger or a touch pen. In addition, the user may be allowed to select a desired application from among the plurality of applications displayed in the menu screen, by making a gesture at the right side surface of the portable electronic apparatus 1.

For example, when the user moves their hand toward the right side surface in a state where the application B is selected as shown in FIG. 16, the application B is activated as shown in FIG. 17. Specifically, the portable electronic apparatus 1 analyzes an infrared image captured by the infrared camera 4, and detects an object (e.g., the hand of the user). When the object is detected, the portable electronic apparatus 1 activates the selected application B. Specifically, the CPU of the control section 14 of the portable electronic apparatus 1 loads a program of the application B from an internal storage unit (e.g., a nonvolatile memory, etc.) of the portable electronic apparatus 1 into the RAM and starts executing the program. Alternatively, the program of the application B may be stored outside the portable electronic apparatus 1, and the portable electronic apparatus 1 may acquire the program via the communication section 15 and may load the program into the RAM.

The condition for activating a selected application is not limited to the portable electronic apparatus 1 detecting an object, and, for example, may be that the portable electronic apparatus 1 detects the hand of the user, may be that the portable electronic apparatus 1 detects a predetermined gesture of the user, may be that the right side surface of the portable electronic apparatus 1 is held by the user, may be that the portable electronic apparatus 1 detects a specific object, may be that the distance between the portable electronic apparatus 1 and the specific object becomes a predetermined value, or may be that the object is moving at a speed higher than a predetermined speed.

For example, by analyzing the infrared image captured by the infrared camera 4, the portable electronic apparatus 1 is able to detect that the user holds the portable electronic apparatus 1 or is able to detect the distance between the portable electronic apparatus 1 and the object. In addition, the portable electronic apparatus 1 may identify a relative distance between the portable electronic apparatus 1 and the specific object on the basis of the size of the specific object included in the infrared image acquired from the infrared camera 4. For example, the portable electronic apparatus 1 may determine that the portable electronic apparatus 1 is held by the user, on the basis of brightness information on the infrared image captured by the infrared camera 4, or may calculate the distance between the portable electronic apparatus 1 and the object. As the distance between the object and the portable electronic apparatus 1 decreases, the brightness of each pixel of the infrared image increases. Thus, the portable electronic apparatus 1 is able to determine that the portable electronic apparatus 1 is held by the user, for example, when the proportion of a region having a brightness equal to or greater than a predetermined value in the captured infrared image is equal to or greater than a predetermined proportion.

On the basis of the brightness of the object included in the infrared image, the portable electronic apparatus 1 is able to calculate a relative distance to the object. On the basis of a change in the relative distance, the portable electronic apparatus 1 is able to calculate a speed of the object. On the basis of the distance and the speed calculated thus, the portable electronic apparatus 1 may activate (start) the application.

The activated application B is started when a predetermined condition is satisfied. For example, in the case where the application B is a game application, a game is started when the user makes a predetermined instruction (an instruction using a button, a touch panel, a gesture, or the like) for starting the game. Alternatively, the game may be started when the portable electronic apparatus 1 detects the hand of the user. In the case where the application B is a game using a gesture, a condition for starting the game may be that the hand of the user is detected, since the game cannot be played unless the hand of the user is not detected. Alternatively, the game may be started when a predetermined time has elapsed from activation of the application B.

FIG. 18 is a diagram showing an example of a screen immediately after the game of the activated application B is started. As shown in FIG. 18, after the game is started, an indication of a remaining time to end of the game and an indication of a score obtained during the game are performed on the display 2. The application B is, for example, a game having an aim of scoring as many points as possible within a predetermined time, and may be a game played by one user, a game in which multiple players cooperate to score points through bidirectional communication with other portable electronic apparatuses 1 (or other apparatuses) using the communication section 15, or a game in which multiple players compete in score. For example, the application B is a game in which a point is added when the user makes a gesture as per an instruction displayed on the display 2. In such a game, when the game is started after the application B is activated, the image shown in FIG. 18 is displayed.

Figure 19:
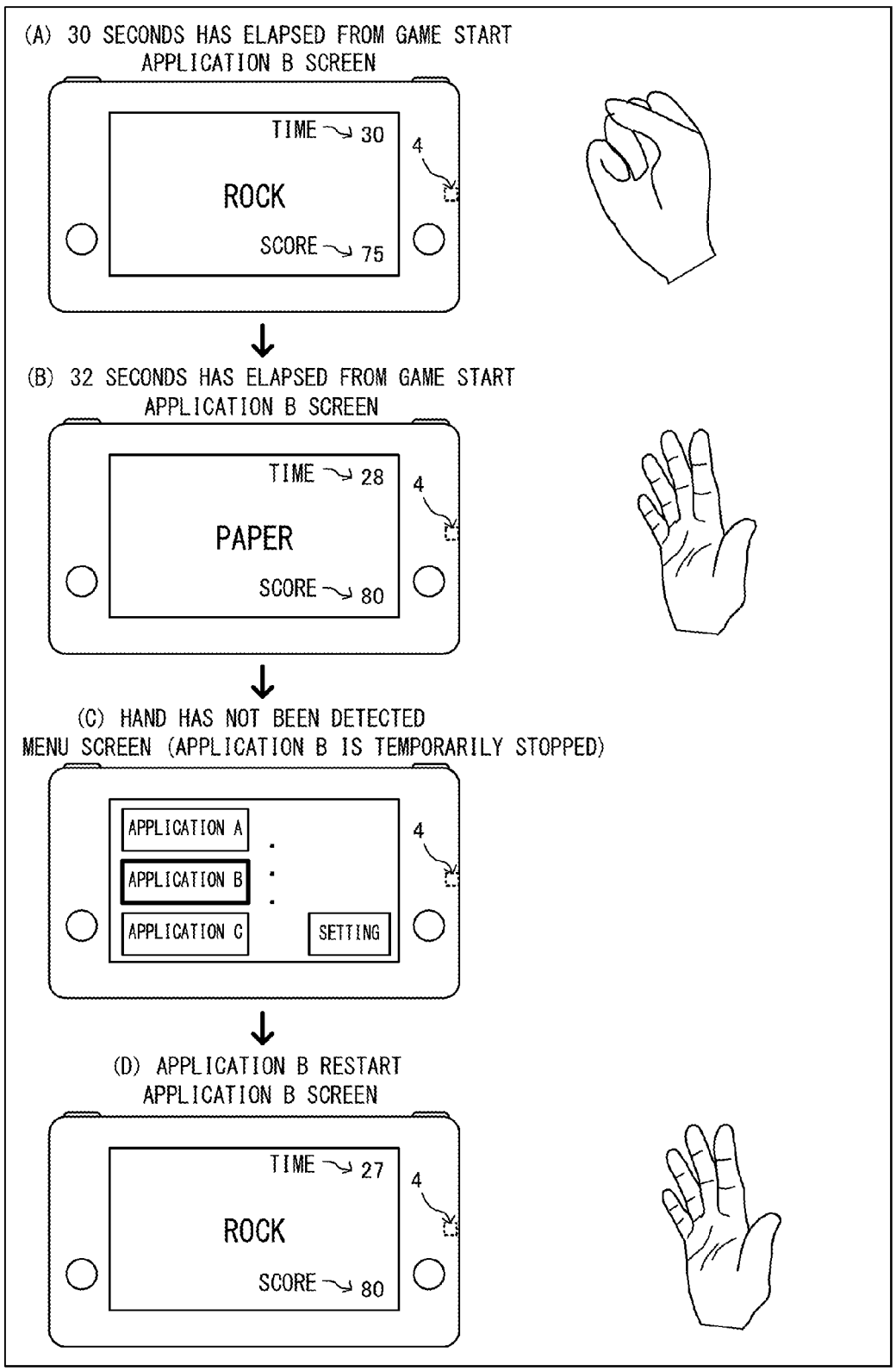
FIG. 19 is an example non-limiting diagram showing an example of screen transition while the game is executed.

FIG. 19 is a diagram showing an example of screen transition during execution of the game. As shown in (A) of FIG. 19, at the time point when 30 seconds has elapsed from the start of the game, the indication of the remaining time is "30", and the score is "75". In addition, an instruction to the user is displayed on the screen, and the user makes a gesture as per the instruction. As shown in (B) of FIG. 19, when 2 seconds has elapsed further, that is, 32 seconds has elapsed from the start of the game, the indication of the remaining time is "28", and points are added by the user making the gesture as per the instruction. As described above, in this game, for example, instructions are displayed one after another according to the rhythm of predetermined music, and a point is added when a gesture is made as per the displayed instruction.

Here, as shown in (C) of FIG. 19, when the hand of the user deviates from the imaging range of the infrared camera 4 and cannot be detected by the infrared camera 4, the game of the application B is temporarily stopped, and the screen returns to the menu screen. For example, when a predetermined waiting time has elapsed from the time when the hand of the user is no longer detected, the screen switches from the game screen of the application B to the menu screen. At this time, the game is temporarily stopped internally, and progress of the game is temporarily stopped. However, the game being presently executed is not ended, and data regarding execution of the game remains in the RAM. For example, values indicating a status of the progress of the game (e.g., the remaining time and the score) are stored in the RAM, and increase in accordance with an elapsed time (or, a user's operation) during execution of the game. When the progress of the game is stopped, increasing (or decreasing) the values indicating the status of the progress is also stopped. In the menu screen, the user is also allowed to select another desired application.

Then, as shown in (D) of FIG. 19, when the hand of the user enters the imaging range of the infrared camera 4 again in a state where the application B is selected, the portable electronic apparatus 1 detects the hand of the user and restarts the game of the application B. Specifically, the game of the application B restarts from a state obtained when the game is temporarily stopped. For example, if the game is temporarily stopped when the remaining time is 28 seconds and the score is 80, the game is restarted from a state where the remaining time is 28 seconds and the score is 80.

More specifically, the portable electronic apparatus 1 restarts the game of the application B immediately after detecting the hand of the user (or, after a period shorter than the above waiting time has elapsed). The portable electronic apparatus 1 is able to control temporal stop/restart of the application as intended by the user, by waiting for a predetermined time when temporarily stopping the application, and restarting the application immediately without waiting for a predetermined time when restarting the application. That is, regarding an application for which a gesture is made using a hand, the user may unintentionally and momentarily move their hand away from the imaging range of the infrared camera 4. In such a case, if the application being presently executed is temporarily stopped immediately, the application is temporarily stopped against the user's intention. However, since the above waiting time is set when the application is temporarily stopped, such temporary stop of the application which is not intended by the user can be prevented. On the other hand, when restarting the application from the menu screen, the user intentionally enters their hand into the imaging range of the infrared camera 4. Thus, when restarting the application, the portable electronic apparatus 1 restarts the application immediately without providing the above waiting time.

Similarly as when temporarily stopping the application, the portable electronic apparatus 1 may restart the application after a predetermined waiting time has elapsed from the time when the hand of the user is detected. In addition, even when temporarily stopping the application or when restarting the application, the portable electronic apparatus 1 may temporarily stop or restart the application immediately without waiting for a predetermined time. Moreover, when the application is temporarily stopped as shown in (C) of FIG. 19, if the application is not restarted even when a predetermined time has elapsed, the portable electronic apparatus 1 may end the application. In this case, even when the user enters their hand into the imaging range of the infrared camera 4 again, the application is started from the beginning.

As described above, in the portable electronic apparatus 1 according to the present embodiment, an interactive application of which progress is controlled in accordance with an input performed by the user is executed. Specifically, the application progresses in accordance with a gesture input performed in the side surface direction of the portable electronic apparatus 1. For example, as an example of the interactive application, a game is executed in which a right/wrong determination with respect to a gesture input is performed, and a point is added in accordance with a result of the right/wrong determination. The application activates and starts when the user puts their hand over the portable electronic apparatus 1 in the side surface direction of the portable electronic apparatus for makes a gesture using their hand in the side surface direction of the portable electronic apparatus 1. In addition, when the user withdraws their hand therefrom in the side surface direction of the portable electronic apparatus 1, the application being presently executed temporarily stops, and the menu screen is displayed. In the menu screen, the user is allowed to select another desired application. When the user puts their hand over the portable electronic apparatus 1 in the side surface direction of the portable electronic apparatus 1 in a state where the temporarily stopped application is selected, the temporarily stopped application is restarted.

In the above-described example, when the user withdraws their hand during execution of the application, that is, the hand of the user is no longer detected in the infrared image captured by the infrared camera 4, the menu screen is displayed. In another example, for example, when the user moves their right hand toward the right side surface of the portable electronic apparatus 1 (or moves their right hand away therefrom) at a predetermined speed, the menu screen may be displayed. In addition, when the user makes a predetermined gesture, the menu screen may be displayed. For example, when the user makes a specific gesture, the application being presently executed may be temporarily stopped, and when the user moves their hand in this state, the menu screen may be displayed.

Figure 20:
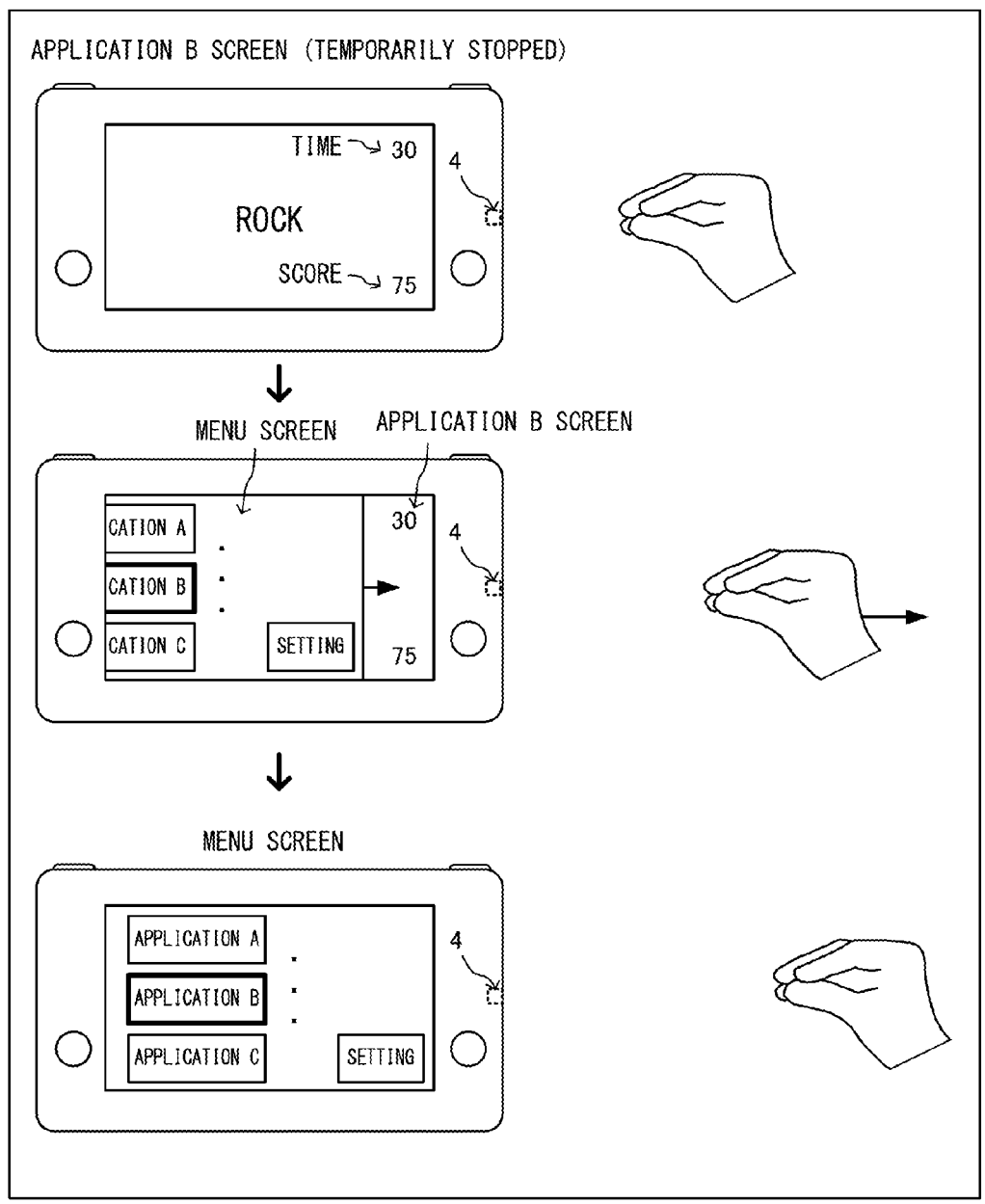
FIG. 20 is an example non-limiting diagram showing an example of a gesture for displaying a menu screen in another embodiment.

FIG. 20 is a diagram showing an example of a gesture for displaying the menu screen in another embodiment. For example, as shown in FIG. 20, when the user makes a gesture as if grasping an object in the right side surface direction of the portable electronic apparatus 1, the application being presently executed is temporarily stopped. When the user moves their hand in the rightward direction in this state, a part of the menu screen appears from the left edge of the display 2 as if being pulled. Then, when the user further moves their hand in the rightward direction, the entire screen of the display 2 switches to the menu screen.

In the above description, when the user puts their hand over the infrared camera 4, the application selected in the menu screen is started (restarted). In another embodiment, in order to prevent an erroneous operation, for example, the selected application may be started when the user makes a predetermined gesture or when the hand is moved at a predetermined speed. In addition, the selected application may be started when the right side surface of the portable electronic apparatus 1 is held by the user. In this case, whether the right side surface of the portable electronic apparatus 1 is held by the user may be determined, for example, on the basis of brightness information on the image captured by the infrared camera 4, or on the basis of a change in the brightness of the image. In addition, the portable electronic apparatus 1 may start (restart) the selected application when the portable electronic apparatus 1 detects the pulse of the user. For example, the portable electronic apparatus 1 is able to detect the pulse of the user on the basis of a change in the brightness of the image captured by the infrared camera 4. An erroneous operation can be prevented by starting the application when the pulse of the user is detected.

A condition regarding detection of an object may be different between activation of the application and start of a predetermined process in the application. In addition, a condition regarding detection of an object may be different between temporary stop of the application and end of the application. For example, when a first condition regarding detection of an object is satisfied, the application may be activated, and when a second condition which is stricter than the first condition is satisfied, the predetermined process in the application may be started. In this case, when the first condition is satisfied and the second condition is not satisfied, the application is activated but the predetermined process in the application is not started. In addition, for example, when the first condition is satisfied, the application may be temporarily stopped, and when the second condition which is stricter than the first condition is satisfied, the application may be ended. In this case, when the first condition is satisfied and the second condition is not satisfied, the application is temporarily stopped but is not ended.

For example, when the portable electronic apparatus 1 detects an object, the application B is activated, and an activation screen (initial screen) of the application B is displayed as shown in FIG. 17. The activation screen is a screen before a predetermined process (game process) in the application B is started. After the activation screen is displayed, for example, when the portable electronic apparatus 1 detects the hand of the user, the game process is started. Specifically, when the portable electronic apparatus 1 detects some kind of an object (some kind of an object regardless whether the object is a hand) in the infrared image captured by the infrared camera 4, the activation screen of the application B is displayed. When the portable electronic apparatus 1 detects the hand of the user in this state, the game starts. That is, as a condition for the activation screen of the application B coming up, the hand of the user does not needs to be detected, this condition is that some kind of an object is detected, and a condition for starting the game process in the application B is that the hand of the user is detected. Even when the hand of the user enters the imaging range of the infrared camera 4, if the distance between the hand and the infrared camera 4 is too small, the portable electronic apparatus 1 can recognize that some kind of an object is present, but cannot recognize whether the object is the hand of the user. In such a case, if the activation screen of the application B does not come up and the menu screen remains displayed, it becomes difficult for the user to understand what operation needs to be performed to activate the application B. Thus, even when the portable electronic apparatus 1 cannot recognize the hand of the user (the second condition is not satisfied), if the portable electronic apparatus 1 detects some kind of an object (the first condition is satisfied), the portable electronic apparatus 1 causes the activation screen of the application B to come up. However, since the game is a game using a gesture, the portable electronic apparatus 1 needs to recognize the hand of the user in order to actually perform the game process. Therefore, the hand of the user being recognized is set as a condition for starting the game. As described above, the application may be started when the first condition regarding detection of an object is satisfied, and when the second condition which is stricter than the first condition is satisfied after the application is started, the predetermined process (game process) in the application may be started.

Also when temporarily stopping and ending the application, similarly, if the first condition regarding detection of an object is satisfied, the application may be temporarily stopped, and if the second condition which is stricter than the first condition is satisfied after the application is started, the application may be ended.

The application to be executed is not limited to the above-described game. For example, a game may be executed in which a predetermined game object is displayed and controlled on the basis of motion of the hand of the user. For example, the portable electronic apparatus 1 may control movement of the game object on the basis of the position of an image captured by the infrared camera 4 (e.g., the position of the center of gravity of a region having a brightness equal to or greater than a predetermined value).

In the above-described embodiment, when the portable electronic apparatus 1 no longer detects the hand of the user during execution of the application, the portable electronic apparatus 1 temporarily stops the application and displays the menu screen. In another embodiment, when the portable electronic apparatus 1 no longer detects the hand of the user during execution of the application, the application may be temporarily stopped, and a screen for whether to end the application may be displayed. When end of the application is instructed by the user in this screen, the application may be ended. In addition, even when there is no instruction made by the user after the application is temporarily stopped, if a predetermined time has elapsed, the application may be ended.

(Details of Guide Indication Process)

Figure 21:
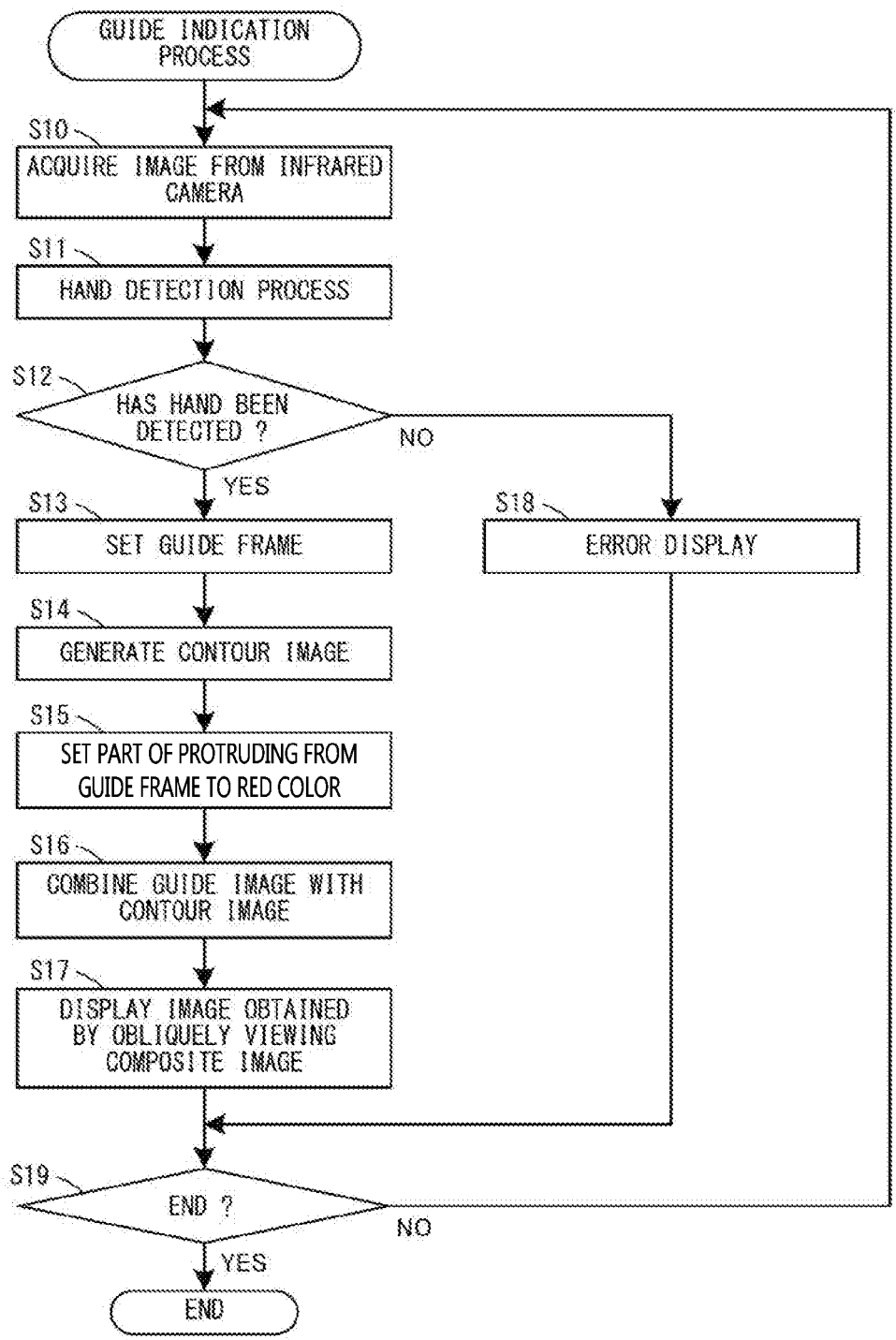
FIG. 21 is an example non-limiting flowchart showing an example of a process for performing the guide indication.

Next, an example of a specific process performed in the portable electronic apparatus 1 will be described. First, a process for performing the above-described guide indication will be described in detail with reference to FIG. 21. FIG. 21 is a flowchart showing an example of the process for performing the guide indication. At predetermined timing (e.g., timing before an instruction is made by the user or the application is started), (the CPU of) the control section 14 loads the program stored in the storage unit into the RAM, and executes the program, thereby performing the process shown in FIG. 21. The process shown in FIG. 21 is repeatedly performed at a predetermined time interval (e.g., every 1/60 second).

As shown in FIG. 21, in step S10, the control section 14 acquires an infrared image from the infrared camera 4. Next, the control section 14 performs a hand detection process of analyzing the infrared image acquired in step S10 and detecting the hand of the user (step S11). As a result of the hand detection process, if the hand has been detected (step S12: YES), the control section 14 sets a guide frame fixed in the acquired infrared image (step S13). Specifically, the control section 14 sets a guide frame which covers a central region of the acquired infrared image and has a certain size.

Subsequently, the control section 14 generates a contour image indicating the contour of the hand of the user included in the acquired infrared image (step S14). Specifically, if a plurality of objects are present in the acquired infrared image, the control section 14 extracts only an object having the highest brightness and detects the contour of the extracted object. Then, the control section 14 keeps the detected contour and deletes pixel information on the part other than the contour. Next, the control section 14 sets pixel information on a part of the generated contour image that protrudes from the guide frame which is set in step S13, to red color (step S15). Subsequently, the control section 14 combines a guide frame image indicating the guide frame which is set in step S13, with the contour image (step S16). Then, the control section 14 generates an image obtained by obliquely viewing a composite image obtained by the combination, and displays the generated image on the display 2 (step S17). Specifically, for example, by performing the process for performing the perspective display as described with reference to FIG. 15, the control section 14 displays an image obtained by rotating the composite image about the Y axis in FIG. 10 by a predetermined angle, at the right edge of the display 2.

On the other hand, as a result of the hand detection process in step S11, if the hand has not been detected (step S12: NO), the control section 14 performs an error display on the display 2 (step S18). For example, the control section 14 may display, on the display 2, letters indicating that the hand has not been detected, and may notify the user that the hand has not been detected, by a voice, vibration, or the like.

After the process in step S17 or step S18 is performed, the control section 14 determines whether to end the process shown in FIG. 21 (step S19). For example, the process shown in FIG. 21 may be ended in accordance with an instruction made by the user, or in accordance with elapse of a predetermined time. If the control section 14 determines not to end the process shown in FIG. 21 (step S19: NO), the control section 14 executes the process in step S10 again. If the control section 14 determines to end the process shown in FIG. 21 (step S19: YES), the control section 14 ends the process shown in FIG. 21.

(Details of Menu Process)

Figure 22:
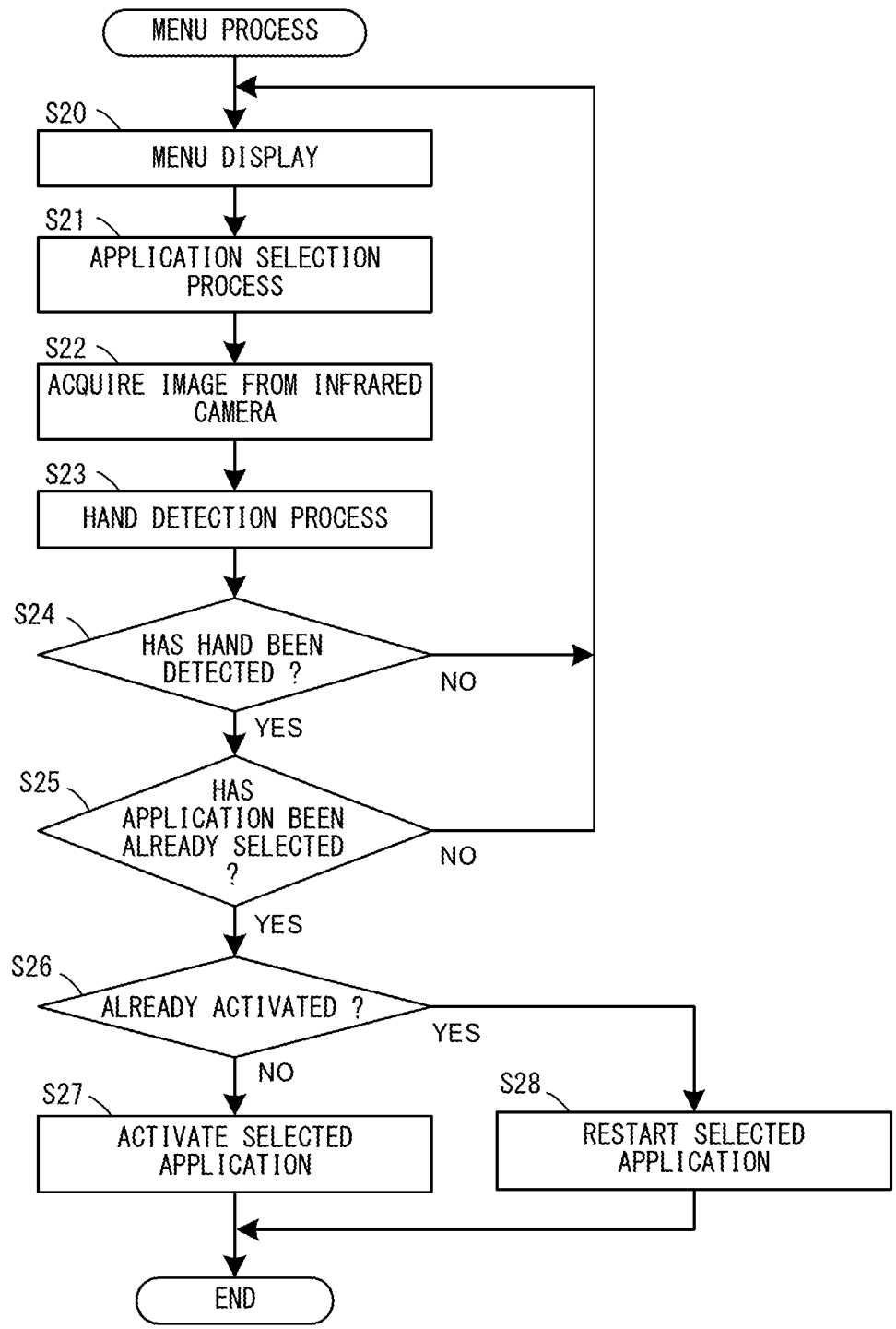
FIG. 22 is an example non-limiting flowchart showing an example of a process for displaying the menu screen.

Next, a process for displaying the above-described menu screen will be described in detail with reference to FIG. 22. FIG. 22 is a flowchart showing an example of the process for displaying the menu screen. The process shown in FIG. 22 is performed by (the CPU of) the control section 14 executing a program for performing a menu display. In addition, the process shown in FIG. 22 is repeatedly performed at a predetermined time interval (e.g., every 1/60 second).

As shown in FIG. 22, in step S20, the control section 14 displays the menu screen on the display 2. For example, the control section 14 acquires a list of applications that are presently executable in the portable electronic apparatus 1, and displays icons indicating the respective applications, side by side on the screen. The applications that are executable in the portable electronic apparatus 1 may be, for example, applications stored in an internal storage unit of the portable electronic apparatus 1 or applications stored in an external storage unit that is accessible from the portable electronic apparatus 1.

Subsequent to step S20, the control section 14 performs an application selection process (step S21). For example, the control section 14 determines whether an icon corresponding to an application has been selected (touched), on the basis of a position detected by the touch panel 3. If the control section 14 determines that the icon has been selected by the user, the control section 14 selects the application corresponding to the selected icon.

Next, the control section 14 acquires an infrared image from the infrared camera 4 (step S22). Next, the control section 14 performs a hand detection process of analyzing the infrared image acquired in step S22 and detecting the hand of the user (step S23). As a result of the hand detection process, if the hand has been detected (step S24: YES), the control section 14 determines whether any application has been already selected (step S25). Specifically, the control section 14 determines whether any application has been already selected by the user in step S21. If any application has been already selected (step S25: YES), the control section 14 determines whether the selected application has been already activated (step S26). Specifically, if the application has been already activated, since information on the application (a program itself and other data) is stored in the RAM, the control section 14 determines whether the application has been already activated, on the basis of the information stored in the RAM.

On the other hand, if, as a result of the hand detection process, the hand has not been detected (step S24: NO), or if no application has been already selected (step S25: NO), the control section 14 performs the process in step S20 again.

If the application has not been already activated (step S26: NO), the control section 14 activates the application selected in step S21. If the application has been already activated (step S26: YES), the control section 14 restarts execution of the selected application (step S28).

After the process in step S27 or step S28, the control section 14 ends the process shown in FIG. 22.

(Details of Application Control Process)

Figure 23:
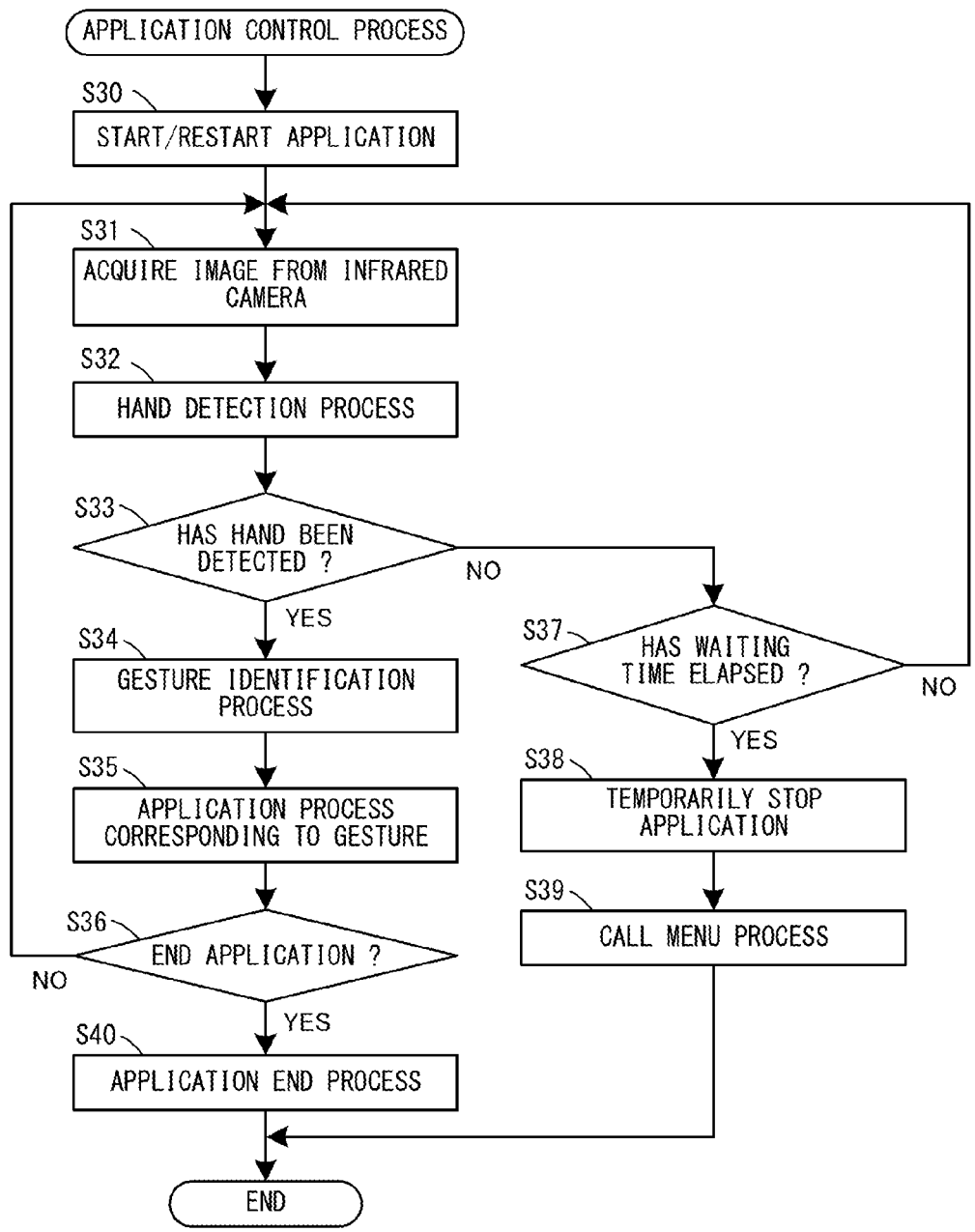
FIG. 23 is an example non-limiting flowchart showing an example of an application control process.

Next, a process for controlling the above-described application will be described in detail with reference to FIG. 23. FIG. 23 is a flowchart showing an example of an application control process. The process shown in FIG. 23 is performed, for example, when the user puts their hand over the right side surface of the portable electronic apparatus 1 as described above. In addition, the process shown in FIG. 23 is repeatedly performed at a predetermined time interval (e.g., every 1/60 second).

As shown in FIG. 23, in step S30, the control section 14 starts (or restarts) the application. Specifically, if the application has not been activated (if the application program has not been loaded into the RAM, or if initial setting for starting the application has not been performed), the control section 14 starts the application in accordance with a predetermined condition being satisfied (a predetermined time having elapsed, or an instruction being made by the user) after activating the application. In addition, if the application has been temporarily stopped (that is, if the application has been already temporarily stopped and the menu screen has been displayed after the application is started), the control section 14 restarts the application. Specifically, the control section 14 reads data for the application that is stored in the RAM, and restarts the application from a state obtained when the application is temporarily stopped in step S38 described later.

Subsequent to step S30, the control section 14 acquires an infrared image from the infrared camera 4 (step S31). Next, the control section 14 performs a hand detection process of analyzing the infrared image acquired in step S31 and detecting the hand of the user (step S32). As a result of the hand detection process, if the hand has been detected (step S33: YES), the control section 14 performs a gesture identification process of identifying a gesture input performed by the user (step S34). Specifically, the control section 14 identifies whether any gesture among a plurality of predetermined gestures has been made, on the basis of the shape or motion of the detected hand.

Subsequently, the control section 14 performs an application process corresponding to the identified gesture (step S35). For example, in the case where the game application shown in FIG. 19 is executed, the control section 14 displays letters, an image, a character, or the like indicating an instruction to the user, on the display 2, and determines whether a gesture corresponding to the instruction has been made. Then, the control section 14 displays a result of the determination on the display 2. For example, if the control section 14 determines that the gesture corresponding to the instruction has been made, the control section 14 adds a point to the score and displays the added score on the display 2. In addition, the control section 14 measures an elapsed time from the start of the application and displays the elapsed time on the display 2. The application process in step S35 may be performed on the basis of, for example, an operation performed on the input button or the attitude of the portable electronic apparatus 1 in addition to (or instead of) the gesture input performed by the user.

Subsequent to step S35, the control section 14 determines whether to end the application (step S36). For example, if a remaining time indicating the time to end of the application has become "0", the control section 14 determines to end the application. In addition, for example, if an operation for ending the application (a button operation or an operation performed through a gesture) has been performed by the user, the control section 14 determines to end the application.

If the control section 14 does not determine to end the application (step S36: NO), the control section 14 performs the process in step S31 again. On the other hand, if the control section 14 determines to end the application (step S36: YES), the control section 14 performs an application end process (step S40) and ends the process shown in FIG. 23. For example, as the application end process, the control section 14 releases an area in the RAM that is allocated for executing the application program. Accordingly, values corresponding to a status of progress of the application (e.g., the above-described remaining time, the above-described score, etc.) are cleared.

On the other hand, if the hand of the user has not been detected in the hand detection process in step S32 (step S33: NO), the control section 14 determines whether a predetermined waiting time has elapsed from the time when the hand of the user is no longer detected (step S37). If the predetermined waiting time has not elapsed from the time when the hand of the user is no longer detected (step S37: NO), the control section 14 performs the process in step S31 again. The predetermined waiting time may be different depending on the type of the application, may be a fixed time, or may be changed in accordance with a status of detection of the hand.

If the predetermined waiting time has elapsed from the time when the hand of the user is no longer detected (step S37: YES), the control section 14 temporarily stops the application being presently executed (step S38). Specifically, the control section 14 temporarily stops the application while keeping the area in the RAM that is allocated for executing the application. For example, if an image of the application has been displayed on the display 2, the control section 14 stores the image into the RAM. In addition, the control section 14 keeps the values corresponding to the status of the progress of the application (e.g., the remaining time, the score, etc.).

If the control section 14 temporarily stops the application in step S38, the control section 14 calls the program for performing the above-described menu process (step S39) and ends the process shown in FIG. 23. Accordingly, the menu process shown in FIG. 22 is performed.

The processes shown in the above-described flowcharts are merely an example, and the order or contents of each process may be changed as appropriate. In addition, the above-described application is merely an example, and any other application may be executed.

(Modifications)

The above-described embodiment is merely an example, and, for example, the following modifications may be made.

For example, the position of the infrared camera 4 is not limited to the right side surface of the portable electronic apparatus 1, the infrared camera 4 may be provided at any of a left side surface (a T2 surface in FIG. 1), the upper side surface (T4 surface), and a lower surface (T3 surface), and a gesture input may be performed by the user in any side surface direction. In addition, the infrared camera 4 may be provided at each of a plurality of side surfaces. For example, in the case where the infrared camera 4 is provided at the left side surface of the portable electronic apparatus 1, the above-described guide indication (the contour image 21 and the guide frame image 22) is displayed at the left side of the screen of the display 2. Moreover, the display position of the guide indication may be different depending on the attitude of the portable electronic apparatus 1. The portable electronic apparatus 1 is able to detect the attitude of the portable electronic apparatus 1 itself with the attitude detection section 16, and, for example, is able to detect by how many degrees the portable electronic apparatus 1 has been rotated about an axis perpendicular to the screen, with an angular velocity sensor or an acceleration sensor. For example, normally, the portable electronic apparatus 1 is held such that the infrared camera 4 is located at the right side as shown in FIG. 6A. However, when the user holds the portable electronic apparatus 1 such that the right and left thereof are inverted, the infrared camera 4 is located at the left side. In this case, the portable electronic apparatus 1 is held with the right hand, and a gesture input is performed with the left hand. In such a case, the guide indication is displayed at the left side of the display 2. Specifically, the guide indication made into perspective form is displayed at the left side of the display 2 so as to be viewable in a manner which is the same as that when the user directly sees the left hand. That is, the guide indication is displayed on the display screen of the display 2 and at the same side as the side surface direction in which an image is captured by the infrared camera 4.

In the above-described embodiment, the portable electronic apparatus 1 provided with the display 2 is assumed to perform the above-described processes. In another embodiment, an image may be displayed on an external display. When the user holds a hand-held input device provided with the infrared camera 4 and makes a gesture using their hand in a side surface direction of the input device, an image of the above-described guide indication, an image of the application, the menu screen, or the like may be displayed on a display device separate from the input device. An information processing system may be constructed in which a hand-held input device provided with the infrared camera 4, a display device, and an information processing apparatus are provided as separate equipment. In this case, for example, the image of the above-described guide indication or the image of the application is displayed on the display device, and the process in the application is performed in the information processing apparatus. For example, the information processing apparatus acquires an image from the input device, recognizes a gesture on the basis of the image, and performs the process in the application on the basis of a result of recognition of the gesture. In addition, the information processing apparatus acquires an image from the input device and performs the process for the above-described guide indication (a process of rendering the contour image 21 and the guide frame image 22 and making these images into perspective form). Then, the information processing apparatus outputs images resulting from the process in the application and the process for the guide indication, to the display device. The above-described processes may be executed such that the above-described processes are divided and performed by the plurality of these equipment. In addition, the portable electronic apparatus 1 may be caused to serve as a controller which receives an input performed by the user. In this case, a display may be provided or may not be provided to the portable electronic apparatus 1. In the case where the portable electronic apparatus 1 serves as a controller, the portable electronic apparatus 1 is connected to another information processing apparatus wirelessly or via a wire. When an operation (an operation on an input button, an operation of moving the portable electronic apparatus 1 itself, or the above-described gesture operation, etc.) is performed on the portable electronic apparatus 1, operation data corresponding to the operation is transmitted to the other information processing apparatus. Upon reception of the operation data, the other information processing apparatus performs a process corresponding to the operation data. The process corresponding to the operation data is different depending on the type of the application to be executed.

The shape of the portable electronic apparatus 1 may be any shape. For example, the portable electronic apparatus 1 (the display 2) may not be horizontally long, may be vertically long, or may have a square shape.

In the above-described embodiment, the infrared camera 4 is used. However, in another embodiment, instead of the infrared camera 4, a camera capable of capturing an image of visible light (an RGB image) may be used.

In the above-described embodiment, the example where the portable electronic apparatus is held with one hand and a gesture input is performed with the other hand with respect to the portable electronic apparatus, has been described. In another embodiment, the portable electronic apparatus may be one that is to be fixed to an arm (body) of the user, such as a watch-type apparatus including a screen.

The shape of the portable electronic apparatus may be any shape, and may be, for example, a plate-like elliptical shape. For example, the electronic apparatus may be foldable.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A system comprising:
   a camera configured to capture a first image of an object located in a side surface direction of the system; and
   at least one processor configured to:
   acquire the first image captured by the camera;
   generate a second image by performing a process of inclining in a predetermined direction the acquired first image or an image obtained by performing predetermined image processing on the acquired first image;
   display the generated second image on a display device; and
   perform a predetermined application process on the basis of the acquired first image.

2. The system according to claim 1, wherein
   the processor displays the second image obtained by obliquely viewing the first image or the image obtained by performing predetermined image processing on the acquired first image, on the display device.

3. The system according to claim 1, wherein
   the processor displays the second image in such a form as to allow a user to recognize relative positions of the camera and an object included in an imaging range of the camera.

4. The system according to claim 1, wherein
   the processor displays the second image in such a form as to allow a user to recognize a position, in a depth direction, of an object included in an imaging range of the camera.

5. The system according to claim 1, wherein
   the processor displays the second image on the display device such that the image of an object included in an imaging range of the camera is viewable in a manner which is the same as that when a user directly sees the object.

6. The system according to claim 1, wherein
   the processor displays a guide image different than the second image which allows a user to recognize whether an object included in an imaging range of the camera is present at an appropriate position.

7. The system according to claim 1, wherein
   the processor further displays, on the display device, a guide image different than the second image indicating a predetermined region in an imaging range of the camera.

8. The system according to claim 7, wherein
   the processor displays, on the display device, an image obtained by inclining the guide image and the second image in a predetermined direction.

9. The system according to claim 1, wherein
   the system comprises a display device,
   the camera captures the first image in a side surface direction of the display device, and the processor displays the second image on a display screen of the display device and at an imaging direction side of the camera.

10. The system according to claim 1, wherein
    the processor displays the second image obtained by inclining the acquired first image or the image obtained by performing predetermined image processing on the acquired first image in the predetermined direction, as well as an image showing a result of the predetermined application process.

11. The system according to claim 1, wherein
    the processor displays, on the display device, an image obtained by abstracting an object included in an imaging range of the camera.

12. The system according to claim 11, wherein
    the processor displays, on the display device, an image indicating a contour of the object included in the imaging range of the camera.

13. The system according to claim 1, wherein
    the processor displays only a specific object among a plurality of objects included in an imaging range of the camera, on the display device.

14. The system according to claim 1, wherein
    the processor is further configured to detect a hand of a user on the basis of the first image, and
    the processor performs the application process on the basis of a result of the detection.

15. The system according to claim 14, wherein
    the processor detects a gesture made by the user.

16. The system according to claim 1, wherein
    the processor is further configured to determine whether at least a part of an object included in the first image protrudes from a predetermined region in an imaging range of the camera, and
    the processor displays an image corresponding to a result of the determination, on the display device.

17. The system according to claim 1, wherein
    the processor displays or hides the second image in accordance with a status of execution of the predetermined application process or a selection made by a user.

18. The system according to claim 1, wherein
    the system is a hand-held electronic apparatus.

19. The system according to claim 1, wherein
    the camera is an infrared camera capable of receiving infrared light.

20. An electronic apparatus comprising:
a camera configured to capture a first image of an object located in a side surface direction of the electronic apparatus; and
at least one processor configured to:
acquire the first image captured by the camera;
generate a second image, said second image obtained by performing a process of inclining a contour image indicated by the acquired first image in a predetermined direction on a display;
display the generated second image on the display device; and
perform a predetermined application process on the basis of the acquired first image.

21. A system comprising:
a camera; and
at least one processor configured to:
acquire a first image captured by the camera;
display a second image, the second image based on the first image, on a display device;
set a fixed region which is smaller than an imaging range of the camera;
display a region image indicating the fixed region on the display device;
determine whether at least a part of an object included in the first image protrudes from the region image; and
control a display form of an image to be displayed on the display device, on the basis of a result of the determination.

22. The system according to claim 21, wherein
the camera captures an image in a side surface direction of the system.

23. A system comprising:
a camera; and
at least one processor configured to:
acquire an image of a specific object captured by the camera;
detect the specific object included in the acquired image;
perform predetermined information processing if the specific object has been detected;
determine whether a predetermined condition is satisfied, on the basis of the acquired image; and
issue a first warning if it is determined that the predetermined condition is satisfied when the specific object has been detected, wherein
the processor performs the predetermined information processing on the basis of the acquired image when it is determined that the predetermined condition is satisfied, wherein
the processor is further configured to issue a second warning different from the first warning, if the specific object has not been detected.

24. The system according to claim 23, wherein
the processor is further configured to stop the predetermined information processing if the specific object has not been detected.

* * * * *